(12) United States Patent
Lopatin et al.

(10) Patent No.: US 8,192,605 B2
(45) Date of Patent: *Jun. 5, 2012

(54) METROLOGY METHODS AND APPARATUS FOR NANOMATERIAL CHARACTERIZATION OF ENERGY STORAGE ELECTRODE STRUCTURES

(75) Inventors: Sergey D. Lopatin, Santa Clara, CA (US); Dmitri A. Brevnov, Santa Clara, CA (US); Eric Casavant, Cupertino, CA (US); Robert Z. Bachrach, Burlingame, CA (US)

(73) Assignee: Applied Materials, Inc., Santa Clara, CA (US)

( * ) Notice: Subject to any disclaimer, the term of this patent is extended or adjusted under 35 U.S.C. 154(b) by 626 days.

This patent is subject to a terminal disclaimer.

(21) Appl. No.: 12/368,105

(22) Filed: Feb. 9, 2009

(65) Prior Publication Data

US 2010/0200403 A1 Aug. 12, 2010

(51) Int. Cl.
*H01M 4/02* (2006.01)
(52) U.S. Cl. ............. 205/57; 205/82; 205/111; 205/170
(58) Field of Classification Search .................. 205/111, 205/57
See application file for complete search history.

(56) References Cited

U.S. PATENT DOCUMENTS

| 512,253 | A | * | 1/1894 | Lockwood | 205/66 |
| 4,551,210 | A | * | 11/1985 | Parthasarathi | 205/50 |
| 5,096,663 | A | * | 3/1992 | Tatarchuk | 419/11 |
| 6,440,288 | B1 | * | 8/2002 | Pyun et al. | 205/81 |
| 6,497,806 | B1 | * | 12/2002 | Endo | 205/111 |
| 6,517,689 | B1 | | 2/2003 | Hongo et al. | |
| 6,773,569 | B2 | | 8/2004 | Sun et al. | |
| 6,808,611 | B2 | | 10/2004 | Sun et al. | |
| 6,899,801 | B2 | | 5/2005 | Balisky et al. | |
| 6,986,835 | B2 | | 1/2006 | Balisky et al. | |
| 7,147,827 | B1 | | 12/2006 | Balisky | |
| 7,160,531 | B1 | | 1/2007 | Jacques et al. | |
| 7,205,153 | B2 | | 4/2007 | Balisky | |
| 2002/0127875 | A1 | | 9/2002 | Weidman et al. | |

(Continued)

FOREIGN PATENT DOCUMENTS

WO WO 2006123049 A2 * 11/2006

(Continued)

OTHER PUBLICATIONS

International Search Report. PCT/US2010/023640 dated Nov. 30, 2010.

(Continued)

*Primary Examiner* — Harry D Wilkins, III
*Assistant Examiner* — Bryan D. Ripa
(74) *Attorney, Agent, or Firm* — Patterson & Sheridan, LLP

(57) ABSTRACT

Embodiments described herein generally relate to methods and apparatus for forming an electrode structure used in an energy storage device. More particularly, embodiments described herein relate to methods and apparatus for characterizing nanomaterials used in forming high capacity electrode structures for energy storage devices. In one embodiment a process for forming an electrode structure for an energy storage device is provided. The process comprises depositing a columnar metal structure over a substrate at a first current density by a diffusion limited deposition process, measuring a capacitance of the columnar metal structure to determine a surface area of the columnar metal structure, and depositing three dimensional porous metal structures over the columnar metal structure at a second current density greater than the first current density.

16 Claims, 18 Drawing Sheets

U.S. PATENT DOCUMENTS

| | | | |
|---|---|---|---|
| 2003/0006135 A1 | 1/2003 | Ban | |
| 2003/0029726 A1 | 2/2003 | Kovarsky et al. | |
| 2003/0036001 A1 | 2/2003 | James et al. | |
| 2003/0099884 A1 | 5/2003 | Chiang et al. | |
| 2003/0118884 A1 | 6/2003 | Hampden-Smith et al. | |
| 2003/0183539 A1* | 10/2003 | Los et al. | 205/789 |
| 2003/0201191 A1 | 10/2003 | Kovarsky et al. | |
| 2003/0209440 A1 | 11/2003 | Sun et al. | |
| 2003/0228532 A1 | 12/2003 | Mui et al. | |
| 2004/0089555 A1 | 5/2004 | Sendai et al. | |
| 2004/0224231 A1* | 11/2004 | Fujimoto et al. | 429/232 |
| 2005/0077182 A1 | 4/2005 | Balisky et al. | |
| 2005/0153564 A1 | 7/2005 | Mak et al. | |
| 2005/0211569 A1* | 9/2005 | Botte et al. | 205/687 |
| 2006/0201813 A1 | 9/2006 | Balisky et al. | |
| 2007/0059584 A1* | 3/2007 | Nakano et al. | 429/40 |
| 2007/0158201 A1* | 7/2007 | Kollata et al. | 205/82 |
| 2007/0194467 A1 | 8/2007 | Yang et al. | |
| 2007/0246350 A1 | 10/2007 | Togashi | |
| 2008/0193848 A1* | 8/2008 | Fujikawa et al. | 429/231.95 |
| 2008/0248189 A1* | 10/2008 | Ohtsuka et al. | 427/58 |
| 2008/0248388 A1* | 10/2008 | Ohtsuka et al. | 429/218.1 |
| 2009/0280407 A1* | 11/2009 | Ito et al. | 429/209 |
| 2009/0316335 A1* | 12/2009 | Simon et al. | 361/502 |

FOREIGN PATENT DOCUMENTS

WO     WO 2008078755 A1 *   7/2008

OTHER PUBLICATIONS

D. Larcher et al article, "In Situ X-Ray Study of the Electrochemical Reation of Li with η'—$Cu_6Sn_5$." Journal of the Electrochemical Society, 147(5), 1658-1662 (2000).

S.D. Beattie et al article, "Single-Bath Electrodeposition of a Combinatorial Library of Binary $Cu_{1-x}Sn_x$ Alloys." Journal of the Electrochemical Society, 150(7), C457-C460 (2003).

S.D. Beattie et al article, "Single Bath, Pulsed Electrodeposition of Copper-Tin Alloy Negative Electrodes for Lithium-ion Batteries." Journal of the Electrochemical Society, 150(7), A894-A898 (2003).

Trahey et al article, "High-Capacity, Microporous Cu6Sn5-Sn Anodes for Li-Ion Batters." Journal of The Electrochemical Society, 156 (5) A385-A389 (2009).

Winter et al article, "Electrochemical Lithiation of Tin and Tin-Based Intermetallics and Composites." Electrochimica Acta (1999), pp. 31-50.

International Search Report and Written Opinion of the International Searching Authority mailed Sep. 28, 2010 in PCT/US2010/023630 (APPM/013527PCTP).

* cited by examiner

METROLOGY METHODS AND APPARATUS FOR NANOMATERIAL CHARACTERIZATION OF ENERGY STORAGE ELECTRODE STRUCTURES

BACKGROUND

1. Field

Embodiments described herein generally relate to methods and apparatus for forming an electrode structure used in an energy storage device. More particularly, embodiments described herein relate to methods and apparatus for characterizing nanomaterials used in forming electrode structures for energy storage devices.

2. Description of the Related Art

Electrical energy can generally be stored in two fundamentally different ways: 1) indirectly in batteries as potential energy available as chemical energy that requires oxidation and reduction of active species, or 2) directly, using electrostatic charge formed on the plates of a capacitor.

An electric battery is a device that converts chemical energy into electrical energy, typically consisting of a group of electric cells that are connected to act as a source of direct current. Generally, a cell consists of two dissimilar substances, a positive electrode and a negative electrode, that conduct electricity, and a third substance, an electrolyte, that acts chemically on the electrodes. The two electrodes are connected by an external circuit (e.g., a piece of copper wire); the electrolyte functions as an ionic conductor for the transfer of the electrons between the electrodes. The voltage, or electromotive force, depends on the chemical properties of the substances used, but is not affected by the size of the electrodes or the amount of electrolyte.

Batteries are classed as either dry cell or wet cell. In a dry cell the electrolyte is absorbed in a porous medium, or is otherwise restrained from flowing. In a wet cell the electrolyte is in liquid form and free to flow and move. Batteries also can be generally divided into two main types—rechargeable and nonrechargeable, or disposable. Disposable batteries, also called primary cells, can be used until the chemical changes that induce the electrical current supply are complete, at which point the battery is discarded. Disposable batteries are most commonly used in smaller, portable devices that are only used intermittently or at a large distance from an alternative power source or have a low current drain. Rechargeable batteries, also called secondary cells, can be reused after being drained. This is done by applying an external electrical current, which causes the chemical changes that occur in use to be reversed. The external devices that supply the appropriate current are called chargers or rechargers.

A battery called the storage battery is generally of the wet-cell type; i.e., it uses a liquid electrolyte and can be recharged many times. The storage battery consists of several cells connected in series. Each cell contains a number of alternately positive and negative plates separated by the liquid electrolyte. The positive plates of the cell are connected to form the positive electrode; similarly, the negative plates form the negative electrode. In the process of charging, the cell is made to operate in reverse of its discharging operation; i.e., current is forced through the cell in the opposite direction, causing the reverse of the chemical reaction that ordinarily takes place during discharge, so that electrical energy is converted into stored chemical energy. The storage battery's greatest use has been in the automobile where it was used to start the internal-combustion engine. Improvements in battery technology have resulted in vehicles in which the battery system supplies power to electric drive motors instead.

Typically, ordinary capacitors store a small amount of charge generally due to their size and thus only store a small amount of electrical energy. In an effort to form an effective electrical energy storage device that can store sufficient charge to be useful as independent power sources, or supplemental power source for a broad spectrum of portable electronic equipment and electric vehicles, devices known as electrochemical capacitors have been created. Electrochemical capacitors are energy storage devices which combine some aspects of the high energy storage potential of batteries with the high energy transfer rate and high recharging capabilities of capacitors. The term electrochemical capacitor is sometimes described in the art as a super-capacitor, electrical double-layer capacitors, or ultra-capacitor. Electrochemical capacitors can have hundreds of times more energy density than conventional capacitors and thousands of times higher power density than batteries. It should be noted that energy storage in electrochemical capacitors can be both Faradaic or non-Faradaic. Energy storage in conventional capacitors is generally non-Faradaic, meaning that no electron transfer takes place across an electrode interface, and the storage of electric charge and energy is electrostatic.

In both the Faradaic and non-Faradaic electrochemical capacitors, capacitance is highly dependent on the characteristics of the electrode and electrode material. Ideally, the electrode material should be electrically conducting and have a large surface area.

To make electric batteries and electrochemical capacitors more of a viable product it is important to reduce the production cost, and improve the efficiency of these types of devices. While previous advances have allowed these batteries to meet the needs of the past, much more drastic changes must be made to meet the needs of the future. More specifically, the charge storing electrode (anode) must be made with much greater energy density. However, theoretical limits on the carbon anodes used today have essentially been reached. This means drastic changes must be made, and taking full advantage of the prospering nanofabrication industry as well as the latest breakthroughs in anode research is essential to meet the needs of the future.

However, simple structures and mechanics change significantly when analyzed at the nanoscale (less then $1^{-6}$ meters), yielding conventional metrology obsolete. Therefore, there is a need for metrology methods of characterizing nanoscale materials used for forming electric batteries and electrochemical capacitors.

SUMMARY

Embodiments described herein generally relate to methods and apparatus for forming an electrode structure used in an energy storage device. More particularly, embodiments described herein relate to methods and apparatus for characterizing nanomaterials used in forming electrode structures for energy storage devices. In one embodiment described herein a process for forming an electrode structure for an energy storage device is provided. The process comprises depositing a columnar metal structure over a substrate at a first current density by a diffusion limited deposition process, measuring a capacitance of the columnar metal structure to determine a surface area of the columnar metal structure, and depositing three dimensional porous metal structures over the columnar metal structure at a second current density greater than the first current density.

In another embodiment described herein a process for characterizing nanomaterials used in forming an electrode structure for an energy storage device is provided. The process comprises depositing a metal electrode structure over a substrate at a current density by a diffusion limited deposition process using a set of plating parameters and measuring a capacitance of the metal electrode to determine a surface area of the metal electrode.

In yet another embodiment described herein a substrate processing system is provided. The substrate processing system comprises a pre-wetting chamber configured to clean a seed layer of a large area substrate, a first plating chamber configured to form a columnar metal layer of a first metal on the seed layer of the large area substrate, a second plating chamber configured to form a porous layer over the columnar metal layer, and a metrology chamber. The metrology chamber comprises an electrolyte solution, a reference electrode disposed in the electrolyte solution, and a counter electrode disposed in the electrolyte solution.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiment without specific recitation.

DETAILED DESCRIPTION

Figure 1A:
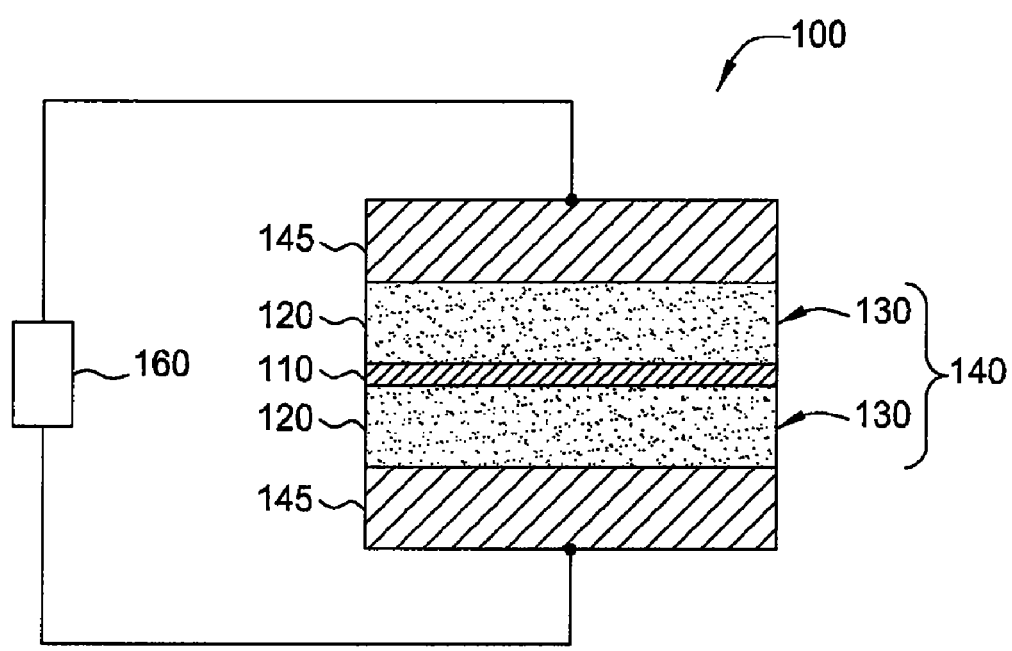
FIG. 1A is a simplified schematic view of an active region of an electrochemical capacitor unit.

Embodiments described herein generally relate to methods and apparatus for forming an electrode structure used in an energy storage device. More particularly, embodiments described herein relate to methods and apparatus for characterizing nanomaterials used in forming electrode structures for energy storage devices such as electric batteries and electrochemical capacitors.

For lithium ion batteries, it is important to have a high surface area anode to maximize energy and power storage density. To analyze the surface area, it may be useful to physically see the surface. However, because the greatest surface area is achieved beyond the scope of light microscopes, other techniques must be used.

Scanning Electron Microscopes (SEMS) are most commonly used due to their versatility and simplicity. A SEM allows users to toposcopically view the anode, giving the user a view of the high surface area structures. However, often it is advantageous to study the thickness as well as the topology of an anode, since the surface area is derived from all 3 dimensions. In one embodiment, a Focused Ion Beam (FIB) may be used to slice a thin section out of the anode. The anode can then be tilted so that the vertical slice can be viewed, allowing the user to derive the depth.

In one embodiment, a comprehensive surface area measurement is taken by taking advantage of the direct relationship between the capacitance and surface area of an electrode. Cyclic voltammetry methods may be used to derive capacitance based on a ramping voltage (dV/dt) and current (i).

Charge is stored in some anodes through $Li^+$ insertion into the crystal matrix of active anodic materials. Therefore, it is often important to study the crystal matrix. In one embodiment, the FIB is used to cut out an ultra thin sample of anodic material, which is then studied with an X-Ray Diffraction microscope (XRD).

In another embodiment, Energy Dispersive x-ray Spectrometry (EDS) may be used. Another interesting anode study involves the detection of the element composition of the nanomaterials. Anodic nanomaterials are often made with the balance of performance (cyclability) and energy storage density in mind.

It is crucial to maximize the amount of lithium an anode can absorb in order to maximize the energy storage density of a battery. This is dependent on the Solid Electrolyte Interface (SEI) surface area and material affinity to Li ion absorbance.

However, absorbing the lithium ions causes the anodic nanomaterial to stretch and expand. It is important that these actions don't degrade the nanomaterial, or the anode will not have high cycle efficiency.

Graphite and carbonaceous materials are the most common anodic material. Although this was not the first anode to be studied, it has become the most successful due to its excellent cyclability (resistance to degradation when cycled). Unlike anodes made of active materials, carbon relies on Li ion "intercalation" between graphene layers. The theoretical charge capacity limit of graphite anodes, where there is one Li ion per six carbon atoms, has essentially been reached.

Using an active anodic material, such as tin (Sn) and/or silicon (Si), can result in a much higher Li-ion charge capacity. Unlike graphite, active anodes rely on Li-ion insertion into the crystal matrix, which can result in a much greater Li ion storage density. The reaction, which can be as great as $Li_{4.4}Sn$ for a Sn substrate, can store 2.5× more charge then carbonaceous materials per gram. Furthermore, the melting point of some lithium-rich phases (such as $Li_{4.4}Sn$) is as high as 400° C., making them a much safer option than the typical graphite anode.

When a great enough potential is established on an anode, a layer between the anode and electrolyte is created, called the Solid Electrolyte Interphase (SEI). Basically, the SEI can be thought of as a three layer system with two important interfaces. In conventional electrochemical studies, it is often referred to as an electrical double layer. In the simplest form, an anode coated by an SEI will undergo three simple steps when charged:

Electron transfer between the anode (M) and SEI

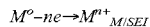

Anion Migration from anode-SEI interface to SEI-electrolyte (E) interface

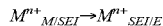

Anion transfer in SEI to electrolyte at SEI/electrolyte interface

For cathodic reactions, the same steps occur, only with cations instead of anions.

The power density and recharge speed of the battery is dependent on how quickly the anode can release and gain charge. This, in turn, is dependent on how quickly the anode can exchange $Li^+$ with the electrolyte through the SEI. $Li^+$ exchange at the SEI is a multi-step process, and as with most multi-step processes, the speed of the entire process is dependent on the slowest or rate limiting step.

Studies have shown that the second step (anion migration) is the bottleneck for most systems. It was also found that the diffusive characteristics of the solvents dictate the speed of migration between the two interfaces. Thus, the best solvents have little mass in order to maximize the speed of diffusion.

The specific properties and reactions that take place at the SEI are not well understood, but it is known that it can have profound effects on cyclability and capacity. It is assumed that when cycled; the SEI can thicken, making diffusion from the Electrode/SEI interface to the SEI/Electrolyte interface longer. This, in turn, causes the battery to have much lower power density. Furthermore, the thickening of the SEI can damage the fragile microstructures of the high surface area nanomaterials.

For inactive materials, charge storage relies on Li ion intercalation between crystal matrices of the anodic material. Intercalation is defined as the thermodynamically reversible inclusion of a molecule within a crystal matrix. Graphite is the most common anode and is inactive. Intercalation within a graphite substrate results in minimal graphite alteration despite the large amounts of foreign molecules absorbed by the crystal matrix. At the atomic level, intercalating atoms (in this case, $Li^+$) assemble between the graphene layers. Theoretically, as much as one Li-ion per 6 carbon atoms can be absorbed by the graphite substrate, or 1 foreign atom per hexagonal carbon ring structure. However, it is important that the lithium gets stripped from its solvent molecules before it intercalates, or the anode could be damaged. Explicitly stated:

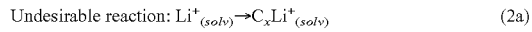

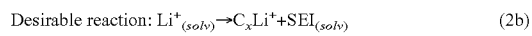

It is theorized that the consequence of an undesirable reaction (referred to as solvent co-intercalation) results in local exfoliation of the anode. If they accumulate, they can lead to the complete destruction of the anode resulting in major losses in capacitance. Despite the problem of solvent co-intercalation and the poor understanding of its nature, graphite anodes have been proven to have excellent cyclability, which has earned them commercial success.

Tin and silicon anodes present several favorable characteristics, such as high Li-ion charge capacity and safer operation. Furthermore, it is expected that solvent co-intercalation is not a problem, because the anodic material relies on Li-ion insertion into the crystal matrix rather then intercalation for lithium charge storage.

However, active materials suffer from dramatic volume changes during charge and discharge cycles, which can be as great as 400%. Unlike carbon, it is theorized that the metallic crystal matrices change dramatically from Li-ion insertion. Because there can be as many as five lithium ions to one Tin atom, many undesirable reactions occur, including immense volume expansion. The $Li^+$ saturation causes the anode to suffer from particle break off, and the desirable high surface area structure of the initial anode often degrades to a flat structure with less than 50% of the initial surface area after cycling. Furthermore, the mechanical stress involved with such drastic volume changes can physically tear the anode off the current collector, ruining the necessary electrical contact between the two layers.

The drive to store large amounts of electrical energy in as small a space as possible presents an inherent safety problem. If a lithium battery is heated and charged beyond its threshold, a thermal runaway reaction can occur. Of course, the thermal stability of a battery depends on several factors, such as electrode material, build quality, and cooling dynamics.

Accelerated Rate Calorimetry (ARC) is the preferred method of measuring this phenomenon. Testing equipment may include a potentiostat to measure voltage variation and a calorimeter to measure exothermic reactions of the cell. It has been demonstrated that charge and temperature are the two main factors affecting cell stability. The stability of a charged cell was shown to always depend on time and temperature. However, the temperature at which thermal runaway occurs is dependent on the charged state of the battery. For example, for a graphitic anode cell, the onset temperature is between about 100° C. and about 200° C., and thermal runaway takes place after 20-40 hours. The slightly overcharged cell, however, has an onset temperature of between about 40° C. and about 150° C. and the cell becomes exothermic after just 4-5 hours.

Lithium batteries are also subject to abuse tests, such as a Short Circuit Test, a Crush Test, and a Nail Puncture Test. The battery typically struggles most with the crush and nail puncture test. It has been found that these tests often result in the battery bursting into flames, quickly releasing all of its energy.

The results of these tests are the primary reason why graphite anode lithium ion batteries have not found commercial success in the transportation industry. New anodic materials are currently being studied that could increase the safety and therefore practicality of these batteries. For example, some phases of lithium-rich tin anodes that are examined have been found to have an onset temperature of 400° C. for thermal runaway. As previously mentioned, the high Li ion charge capacity and stability of Sn anode batteries have immense potential for commercial success, if cycle life could be improved.

As previously mentioned, it is possible for a Li-ion battery to undergo a thermal runaway reaction. If some part of the cell becomes exothermic due to a malfunction, it is important that heat from this sector be dissipated before the entire cell begins thermal runaway. Although slightly lower in energy density then cylindrical cells, prismatic shaped cells have found commercial success due to their ability to efficiently dissipate heat.

A prism inherently has a higher surface area to volume ratio then a cylinder for all practical applications. This means that the battery inherently has greater area for heat dissipation. This leads into the second advantage of prismatic shaped cells. They tend to utilize few electrode-electrolyte layers, making the total cell exposure to a heating area far less. For example, if an exothermic reaction took place anywhere in a prismatic cell, heat would quickly reach at least two surfaces where it could be harmlessly dissipated. If, however, an exothermic reaction were to take place in a cylindrical cell, heat from the area may have to travel through many insulating layers of electrodes/electrolytes before it could reach the surface. Furthermore, even if the reaction happened near the surface, heat would likely only be exposed to that single surface.

It is advantageous to make anodes out of high surface area nanomaterials. In one embodiment, the surface area of an anode is determined using capacitance measurements, SEM topology, and FIB cross sections. The capacitance measurement may be used as the most definite measurement, and SEM and FIB metrology may be used to explain the results. Capacitance is directly proportional to thickness which can be quantified using a FIB cross section measurement. It is also believed that capacitance varies with pore size and distribution. It is further believed that dendrite density effects capacitance.

The Li-ion capacity of an anodic material is dependent on SEI surface area. SEI surface area is dependent on anodic surface area, thereby implying that a high Li ion capacity is due to a high surface area anode.

FIG. 1A illustrates a simplified schematic view of an active region 140 of an electrochemical capacitor unit 100 that can be powered by use of a power source 160. An electrochemical capacitor unit 100 can be of any shape, e.g., circular, square, rectangle, polygonal, and size. The active region 140 generally contains a membrane 110, porous electrodes 120 formed according to embodiments described herein, charge collector plates 145 and an electrolyte 130 that is in contact with the porous electrodes 120, charge collector plates 145 and membrane 110. The electrically conductive charge collector plates 145 sandwich the porous electrodes 120 and membrane 110.

The electrolyte 130 that is contained between the charge collector plates 145 generally provides a charge reservoir for the electrochemical capacitor unit 100. The electrolyte 130 can be a solid or a fluid material that has a desirable electrical resistance and properties to achieve desirable charge or discharge properties of the formed device. If the electrolyte is a fluid, the electrolyte enters the pores of the electrode material and provides the ionic charge carriers for charge storage. A fluid electrolyte requires that a membrane 110 be non-conducting to prevent shorting of the charge collected on either of the charge collector plates 145.

The membrane 110 is typically permeable to allow ion flow between the electrodes and is fluid permeable. Examples of non-conducting permeable separator material are porous hydrophilic polyethylene, polypropylene, polyolefin, fiberglass mats, and porous glass paper. The membrane 110 can be made from an ion exchange resin material, polymeric material, or a porous inorganic support. For example, three layers of polyolefin, three layers of polyolefin with ceramic particles, an ionic perfluoronated sulfonic acid polymer membrane, such as Nafion™, available from the E.I. DuPont de Nemeours & Co. Other suitable membrane materials include Gore Select™ sulphonated fluorocarbon polymers, the polybenzimidazole (PBI) membrane (available from Celanese Chemicals, Dallas, Tex.), polyether ether ketone (PEEK) membranes and other materials.

The porous electrodes 120 generally contain a conductive material that has a large surface area and has a desirable pore distribution to allow the electrolyte 130 to permeate the structure. The porous electrodes 120 generally requires a large surface area to provide an area to form a double-layer and/or an area to allow a reaction between the solid porous electrode material and the electrolyte components, such as pseudocapacitance type capacitors. The porous electrodes 120 can be formed from various metals, plastics, glass materials, graphites, or other suitable materials. In one embodiment, the porous electrode 120 is made of any conductive material, such as a metal, plastic, graphite, polymers, carbon-containing polymer, composite, or other suitable materials. More specifically, the porous electrode 120 may comprise copper, aluminum, zinc, nickel, cobalt, palladium, platinum, tin, ruthenium, titanium, lithium, alloys thereof, and combinations thereof.

Figure 1B:
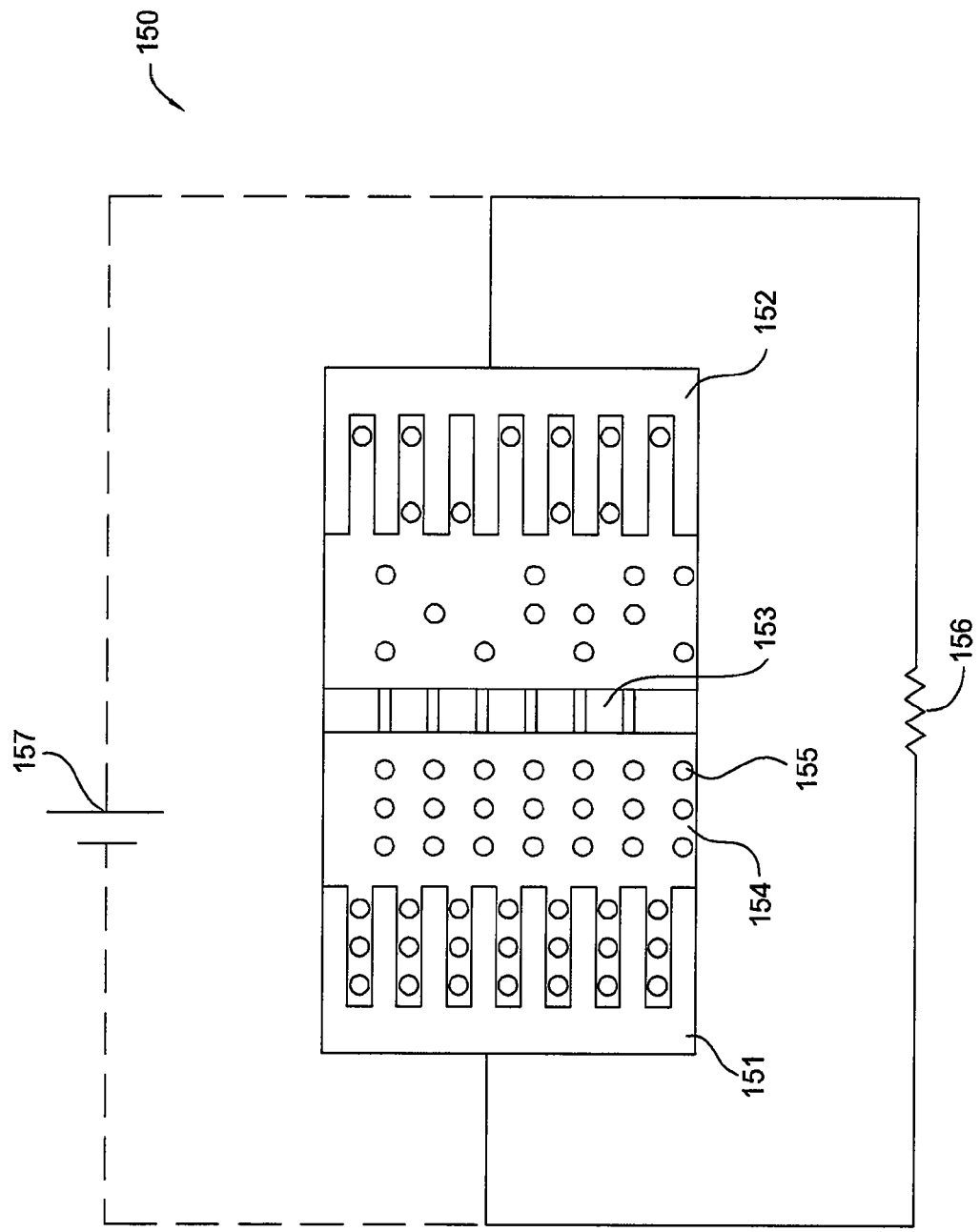
FIG. 1B is a simplified schematic view of a lithium-ion battery cell.

FIG. 1B is a simplified schematic view of a lithium-ion battery cell 150. Lithium-ion batteries are a type of electrochemical batteries. A plurality of lithium-ion battery cells 150 can be assembled together when in use. The lithium-ion battery cell 150 comprises an anode 151, and a cathode 152, a separator 153, and an electrolyte 154 that is in contact with the anode 151, the cathode 152, the separator 153, and an electrolyte 154 disposed between the anode 151 and the cathode 152.

Both the anode 151 and the cathode 152 comprise materials into which and from which lithium can migrate. The process of lithium moving into the anode 151 or cathode 152 is referred to as insertion or intercalation. The reverse process, in which lithium moves out of the anode 151 or cathode 152, is referred to as extraction or deintercalation. When the lithium-ion battery cell 150 is discharging, lithium is extracted from the anode 151 and inserted into the cathode 152. When the lithium-ion battery cell 150 is charging, lithium is extracted from the cathode 152 and inserted into the anode 151.

The anode 151 is configured to store lithium ions 155. The anode 151 may be formed from carbon containing material or metallic material. The anode 151 may comprise oxides, phosphates, fluorophosphates, or silicates.

The separator 153 is configured to supply ion channels for in movement between the anode 151 and the cathode 152 while keeping the anode 151 and the cathode 152 physically separated to avoid a short. The separator 153 may be solid polymer, such as polyolefin or polyethyleneoxide (PEO).

The electrolyte 154 is generally a solution of lithium salts. such as $LiPF_6$, $LiBF_4$, or $LiClO_4$, in an organic solvents.

When the lithium-ion battery cell 150 discharges, lithium ions 155 move from the anode 151 to the cathode 152 providing a current to power a load 156 connected between the anode 151 and the cathode 152. When the lithium-ion battery cell 150 is depleted, a charger 157 may be connected between the anode 151 and the cathode 152 providing a current to drive the lithium ions 155 to the anode 151. Since the amount of energy stored in the lithium-ion battery cell 150 defends on the amount of lithium ion 155 stored in the anode 151, it is desirable to have as large a surface area on the anode 151 as possible. Embodiments described herein provide methods and apparatus for producing electrodes with increased surface area.

Figure 2:
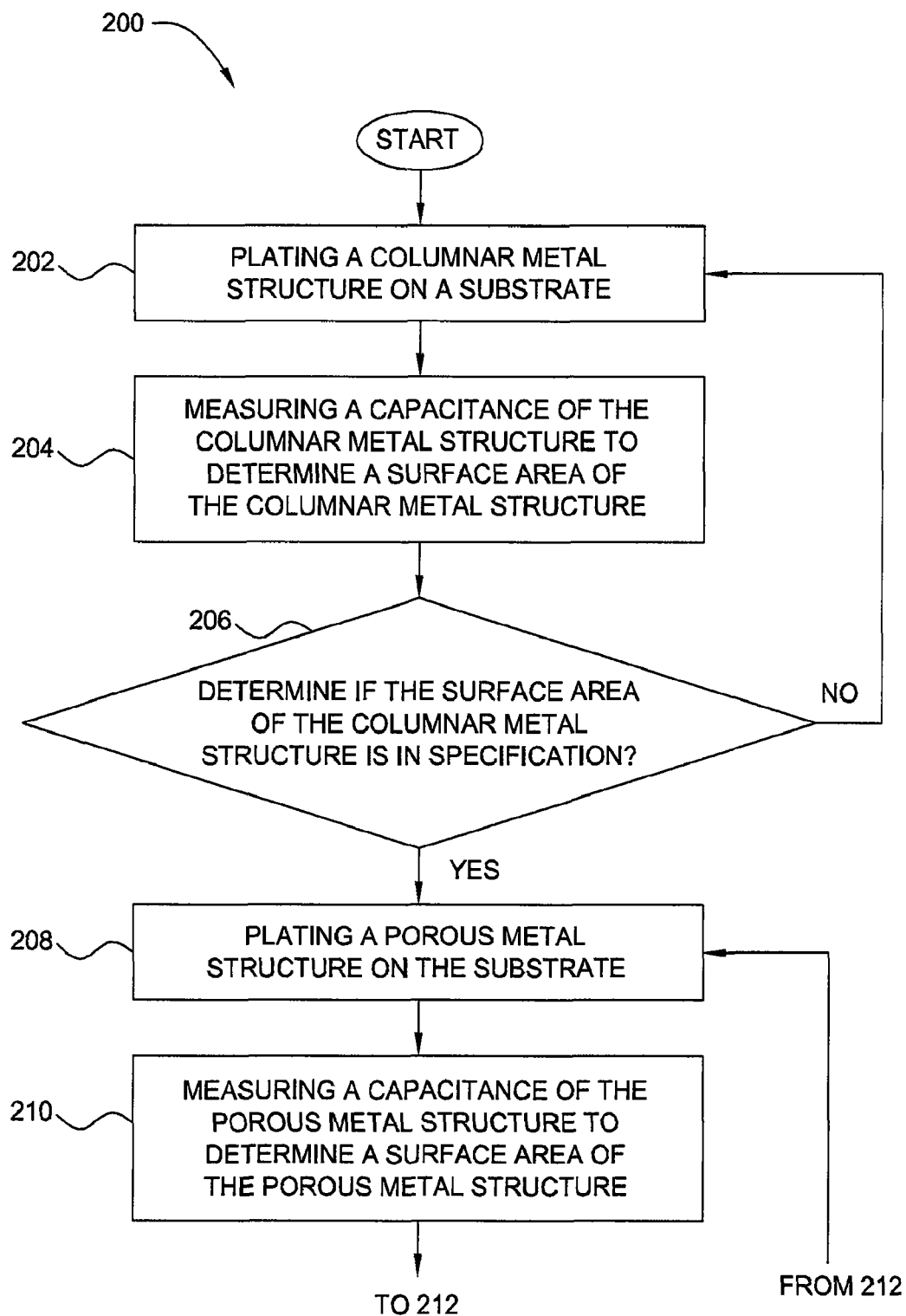
FIG. 2 is a flow diagram of a method for forming an electrode in accordance with embodiments described herein.
Figure 2:
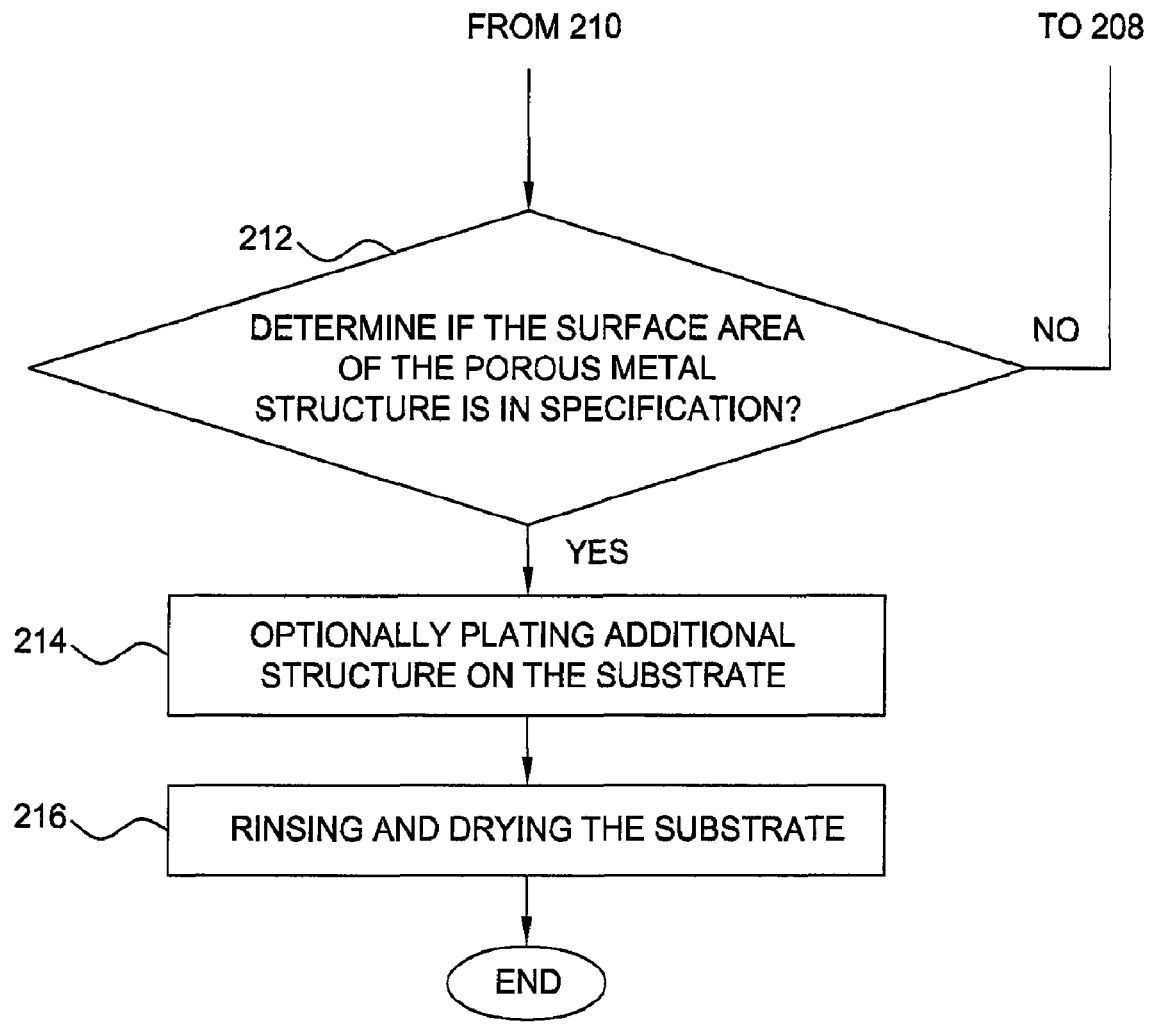
Figure 3A:
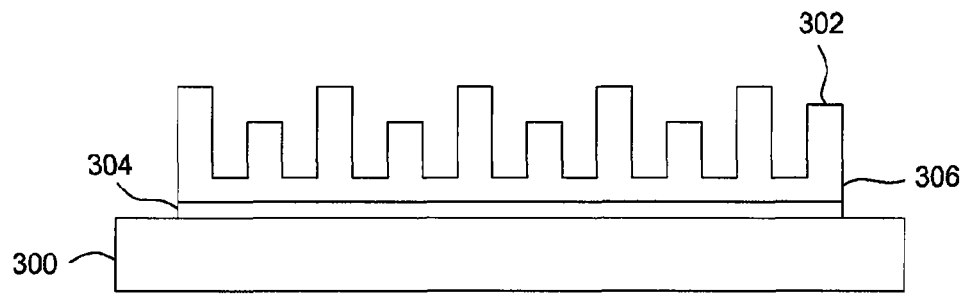
FIGS. 3A-3C are schematic cross-sectional views showing formation of an anode according to embodiments described herein.
Figure 3B:
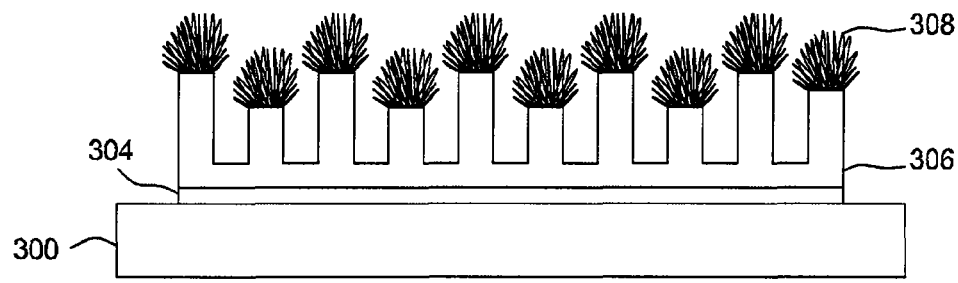
Figure 3C:
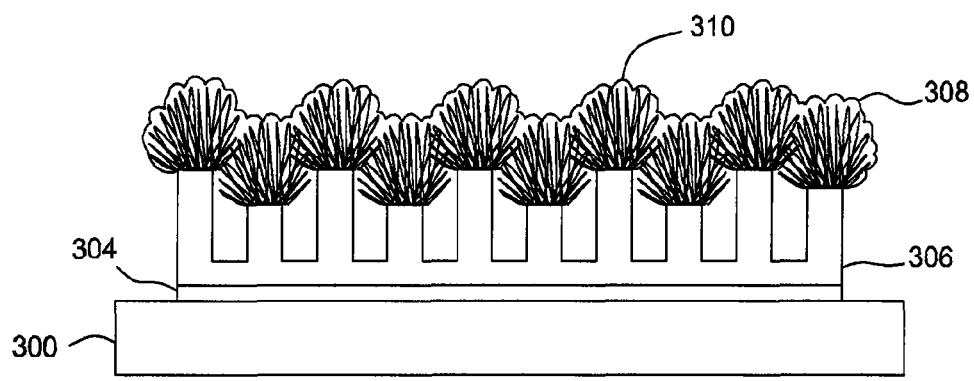

FIG. 2 is a flow diagram according to one embodiment described herein of a process 200 for forming an electrode in accordance with embodiments described herein. FIGS. 3A-3C are schematic cross-sectional views of an electrode formed according to embodiments described herein. The process 200 includes process steps 202-212, wherein an electrode is formed on a substrate 300. The process 200 may be performed on electroplating systems as well as other systems.

The first process step 202 includes plating a columnar metal layer 302 on a substrate 300. The substrate 300 may comprise a material selected from the group comprising copper, aluminum, nickel, zinc, tin, flexible materials, stainless steel, and combinations thereof. Flexible substrates can be constructed from polymeric materials, such as a polyimide (e.g., KAPTON™ by DuPont Corporation), polyethyleneterephthalate (PET), polyacrylates, polycarbonate, silicone, epoxy resins, silicone-functionalized epoxy resins, polyester (e.g., MYLAR™ by E.I. du Pont de Nemours & Co.), APICAL AV manufactured by Kanegaftigi Chemical Industry Company, UPILEX manufactured by UBE Industries, Ltd.; polyethersulfones (PES) manufactured by Sumitomo, a polyetherimide (e.g., ULTEM by General Electric Company), and polyethylenenaphthalene (PEN). In some cases the substrate can be constructed from a metal foil, such as stainless steel that has an insulating coating disposed thereon. Alternately, flexible substrate can be constructed from a relatively thin glass that is reinforced with a polymeric coating.

In one embodiment, an optional barrier layer 304 is deposited over the substrate prior to deposition of the columnar metal layer 302. The barrier layer 304 may be deposited to prevent or inhibit diffusion of subsequently deposited materials over the barrier layer into the underlying substrate. Examples of barrier layer materials include refractory metals and refractory metal nitrides such as tantalum (Ta), tantalum nitride ($TaN_x$), titanium (Ti), titanium nitride ($TiN_x$), tungsten (W), tungsten nitride ($WN_x$), and combinations thereof. Other examples of barrier layer materials include PVD titanium stuffed with nitrogen, doped silicon, aluminum, aluminum oxides, titanium silicon nitride, tungsten silicon nitride, and combinations thereof.

In one embodiment, an optional seed layer 306 may be deposited over the substrate prior to deposition of the columnar metal layer 302. The seed layer 306 comprises a conductive metal that aids in subsequent deposition of materials thereover. The seed layer 306 preferably comprises a copper seed layer or alloys thereof. Other metals, particularly noble metals, may also be used for the seed layer. The seed layer 306 may be deposited over the barrier layer by techniques conventionally known in the art including physical vapor deposition techniques, chemical vapor deposition techniques, evaporation, and electroless deposition techniques.

Formation of the columnar metal structure 302 includes establishing process conditions under which evolution of hydrogen results in the formation of a porous metal film. Formation of the columnar metal structure 302 generally takes place in a plating chamber using a suitable plating solution. Suitable plating solutions that may be used with the processes described herein to plate copper may include at least one copper source compound, at least one acid based electrolyte, and optional additives.

The columnar metal structure 302 or "tree structure" is formed using a high plating rate deposition process. The columnar metal structure 302 typically includes trees or posts which are separated from each other. The current densities of the deposition bias are selected such that the current densities are above the limiting current ($i_L$). When the limiting current is reached the columnar metal structure is formed and resulting dendritic type film growth that occurs due to the mass transport limited process. When the evolution of hydrogen gas begins it results in porous layers with pores surrounded by dendritic film structure.

During formation of the columnar metal structure, the deposition bias generally has a current density of about 10 $A/cm^2$ or less, preferably about 5 $A/cm^2$ or less, more preferably at about 3 $A/cm^2$ or less. In one embodiment, the deposition bias has a current density in the range from about 0.05 $A/cm^2$ to about 3.0 $A/cm^2$. In another embodiment, the deposition bias has a current density between about 0.1 $A/cm^2$ and about 0.5 $A/cm^2$. In yet another embodiment, the deposition bias has a current density between about 0.05 $A/cm^2$ and about 0.3 $A/cm^2$. In yet another embodiment, the deposition bias has a current density between about 0.05 $A/cm^2$ and about 0.2 $A/cm^2$.

The second process step 204 includes measuring a capacitance of the columnar metal structure 302 to determine a surface area of the columnar metal structure 302. In one embodiment, cyclic voltammetry techniques are used to determine the capacitance of the columnar metal structure 302. The surface area of electrode's can be compared through electrical capacitance measurements. The capacitance (C) of an ideal electrode is defined as the charge (Q) gathered within the surface for a given electric potential (V). The capacitance of an object is proportional to the material's surface area ($A_s$).

The third process step 206 includes determining if the surface area of the columnar metal structure is in specification. In one embodiment, the specifications are determined by plating on a substrate or a series of substrates using similar plating conditions until the desired surface are of the columnar metal structure 302 is determined. In one embodiment, if the surface area of the columnar metal structure 302 is not within specification, the plating parameters may be adjusted to achieve specification. For example, the process may return to the first process step 202 and continue plating the columnar metal layer 302 on the substrate 300 using the adjusted plating parameters. In one embodiment, further plating of the columnar metal structure 302 may take place using the adjusted plating parameters in a feed forward process. In another embodiment, the adjusted plating parameters may be used to plate a columnar structure on a subsequent substrate in a feed back process. In another embodiment, a sample substrate is processed and monitored in parallel with the substrate 300 and the results from the monitoring of the sample substrate are used to modify the processing conditions for the substrate 300.

The fourth process step 208 includes plating a porous structure 308 on the substrate 300. The porous structure 308 may be formed on the columnar metal structure 306 by increasing the voltage and corresponding current density from the voltage and corresponding current density for the deposition of the columnar metal structure 306. The deposition bias generally has a current density of about 10 A/cm² or less, preferably about 5 A/cm² or less, more preferably at about 3 A/cm² or less. In one embodiment, the deposition bias has a current density in the range from about 0.3 A/cm² to about 3.0 A/cm². In another embodiment, the deposition bias has a current density in the range of about 1 A/cm² and about 2 A/cm². In yet another embodiment, the deposition bias has a current density in the range of about 0.5 A/cm² and about 2 A/cm². In yet another embodiment, the deposition bias has a current density in the range of about 0.3 A/cm² and about 1 A/cm². In yet another embodiment, the deposition bias has a current density in the range of about 0.3 A/cm² and about 2 A/cm².

In one embodiment, the porous metal structure 308 may comprise one or more of various forms of porosities. In one embodiment, the porous structure 308 comprises macro porosity structure having pores of about 100 microns or less, wherein the non-porous portion of the macro porosity structure having pores of between about 2 nm to about 50 nm in diameter (meso-porosity). In another embodiment, the porous structure 308 comprises macro porosity structure having pores of about 30 microns. Additionally, surface of the porous structure 308 may comprise nano structures. The combination of micro porosity, meso-porosity, and nano structure greatly increases surface area of the porous structure 308.

The fifth process step 210 includes measuring a capacitance of the porous metal structure 308 to determine a surface area of the porous metal structure 308. As discussed herein, in one embodiment, cyclic voltammetry techniques are used to determine the capacitance of the porous metal structure 308.

The sixth process step 212 includes determining if the surface area of the porous metal structure 308 is in specification. In one embodiment, the specifications are determined by plating on a substrate or a series of substrates using similar plating conditions until the desired surface area of the porous metal structure 308 is determined. In one embodiment, if the surface area of the porous metal structure 308 is not within specification, the plating parameters may be adjusted to achieve specification. For example, the process may return to the first process step 2102 and continue plating the porous metal structure 308 on the substrate 300 using the adjusted plating parameters. In one embodiment, further plating of the porous metal structure 308 may take place using the adjusted plating parameters in a feed forward process. In another embodiment, the adjusted plating parameters may be used to plate a porous metal structure 308 on a subsequent substrate in a feed back process.

Optionally, a seventh process step 214 including plating additional layers or structures on the substrate 300 may be performed. In one embodiment, the additional structures or layers may comprise a passivation layer 310. The passivation layer 310 can be formed by an electrochemical plating process. The passivation layer 310 provides high capacity and long cycle life for the electrode to be formed. In one embodiment, the porous structure 308 comprises copper and tin alloy and the passivation layer 310 comprises a tin film. In another embodiment, the porous structure 308 comprises cobalt and tin alloy. In one embodiment, the passivation layer 310 may be formed by immersing the substrate 300 in a new plating bath configured to plate the passivation layer 310 after a rinsing step.

Optionally, an eighth processing step 216 the substrate 300 may be rinsed and dried prior to subsequent processing. It should be understood that the capacitance of the structures can be measured at any point during the process. It should also be understood that the capacitance of the structures can be measure a single time during the process or multiple times during the process.

In one embodiment, a sample of the electrode may be taken at some point during the aforementioned plating process to evaluate the effectiveness of the plating process. The parameters of the plating process may be evaluated in response to the results in either a feed forward or feed back type of method.

Although discussed with regards to Cyclic Voltammetry Techniques, it should be understood that other types of metrology including Scanning Electron Microscopy techniques, Energy Dispersive X-Ray Spectrometry techniques, Focused Ion Beam techniques, and Confocal Optical Imaging techniques may be performed throughout the aforementioned process. It should also be understood that the metrology techniques discussed herein may be performed either in-situ or ex-situ.

Cyclic Voltammetry Techniques:

In one embodiment, cyclic voltammetry techniques are used to determine the capacitance and corresponding surface area of an electrode. The surface area of electrode's can be compared using electrical capacitance measurements. The capacitance (C) of an ideal electrode is defined as the charge (Q) gathered within the surface for a given electric potential (V). The capacitance of an object is proportional to the material's surface area ($A_s$).

$$C = \frac{Q}{V} \tag{1.1}$$

$$C \propto A_s \tag{1.2}$$

Rearranging and taking the first derivative of equation 1.1 yields equation 1.3.

$$\frac{dQ}{dt} = C\frac{dV}{dt} \tag{1.3}$$

dQ/dt is defined as current (i), which can be easily measured (unlike charge). dV/dt is known as the ramping voltage (V').

$$i = CV' \tag{1.4}$$

Rearrangement of equation 1.4 and substitution of C with A yields equation 1.5:

$$\frac{i}{V'} \propto A_s \tag{1.5}$$

Assuming that the anode behaves like an ideal electrode, or is off by a constant variable which can be eliminated, the relative surface area of the anode can be easily measured.

Figure 4:
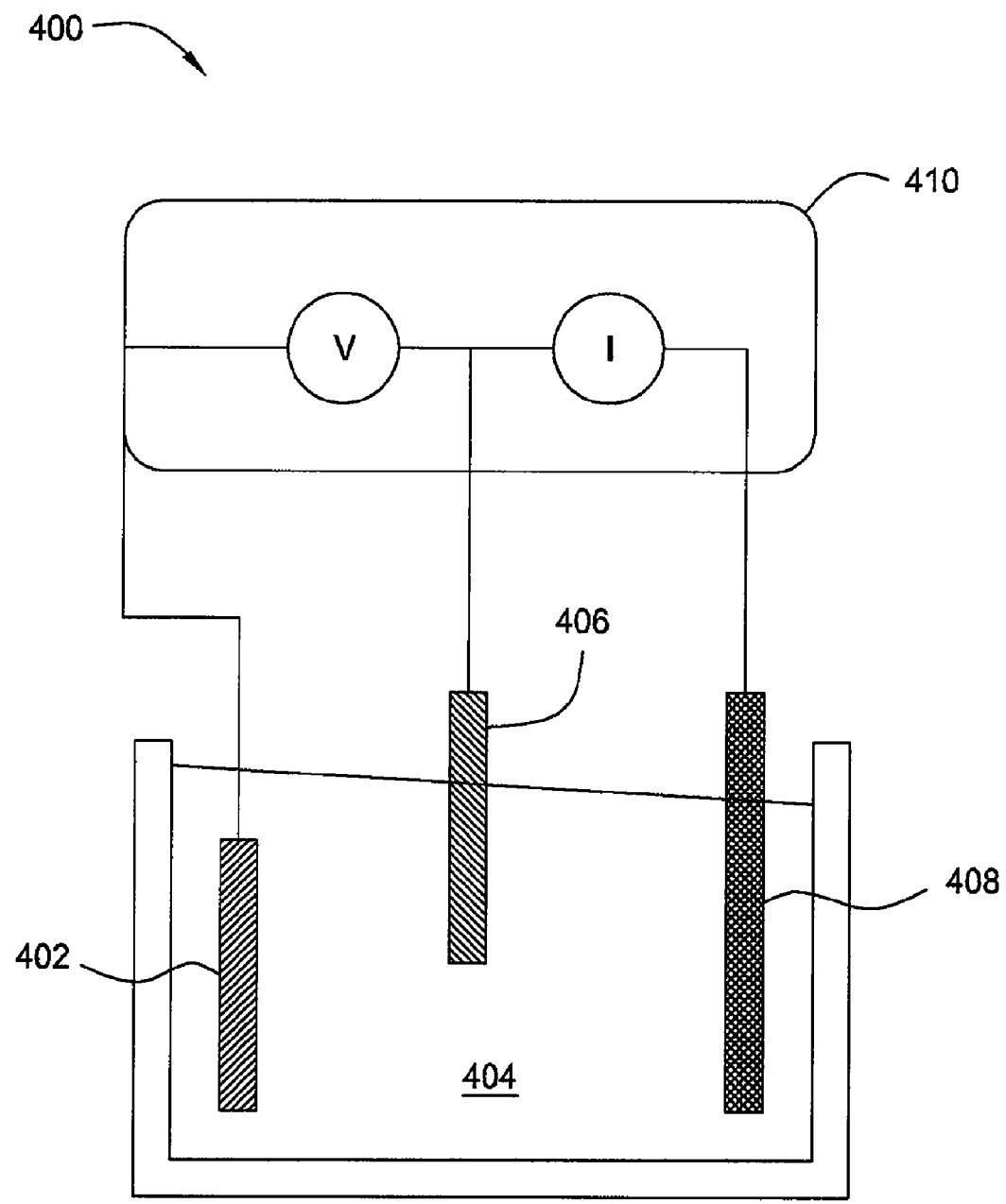
FIG. 4 is a simplified schematic view of a cyclic voltammetry testing cell according to embodiments described herein.

FIG. 4 is a simplified schematic view of a cyclic voltammetry testing cell 400 according to embodiments described. In one embodiment, the test is performed using a three electrode setup as shown in FIG. 4. The working electrode 402 is the electrode being tested. The electrolyte 404 is specific to what is trying to be accomplished, but typically serves as the reactant to the voltage ramping of the working electrode 402. The reference electrode 406 is made of a material that is stable across a known range of potentials. The reference electrode 406 comprises a material selected from the group comprising silver-silver chloride (Ag|AgCl), copper-copper (II) sulfate (Cu|Cu(II)SO$_4$), silver-silver bromide (Ag|AgBr), mercury-mercury chloride (Hg|Hg$_2$Cl$_2$), and copper-copper pyrophosphate. The counter electrode 408 maintains an opposite electropotential to the working electrode 402 and ensures that any redox reactions occurring at the working electrode 402 are countered by opposite reactions.

In one embodiment, the reference electrode 406 comprises copper foil, the counter electrode 408 comprises platinized titanium, and the working electrode 402 comprises the anode to be tested. In one embodiment, the electrolyte comprises an aqueous solution of 0.5 M pyrophosphate solution (pH~10 at room temperature), which does not react with the working electrode 402. While this setup may seem unusual for an electrochemical test, since only the capacitance of the working electrode 402 is being tested to determine the surface area of the working electrode it is undesirable for any redox reactions to occur that might supply current to the working electrode 402.

Cyclic voltammetry is used to comparatively measure the surface area of the anodes. As previously discussed, the surface area (A) of an electrode is proportional to the current (i) divided by the ramping voltage (V').

$$\frac{i}{V'} \propto A \tag{1.5}$$

Figure 5A:
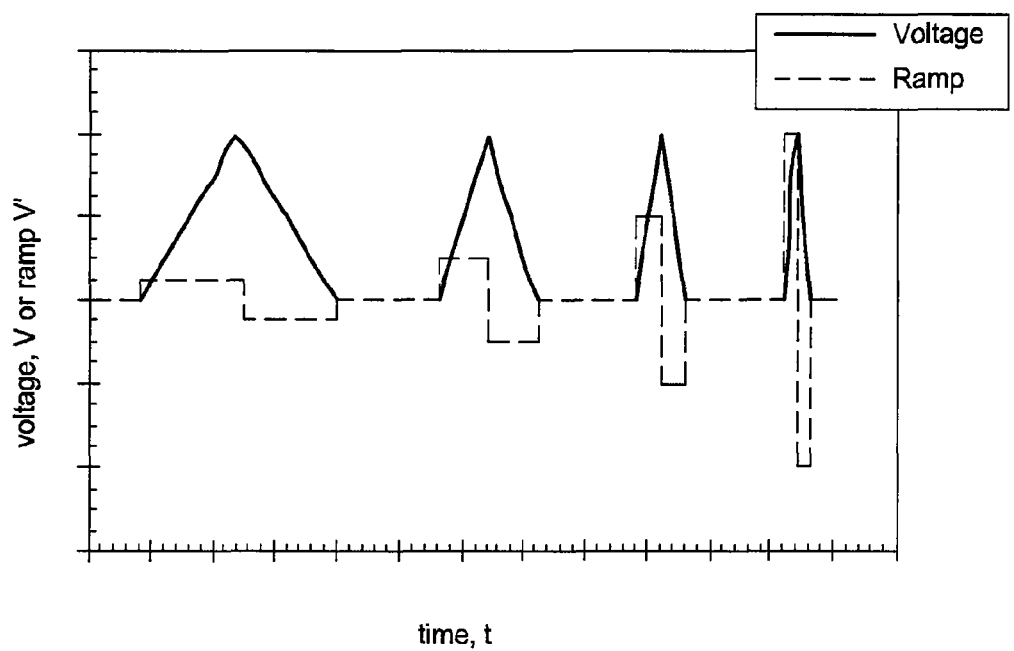
FIG. 5A is a graph illustrating ramping voltage verses time.
Figure 5B:
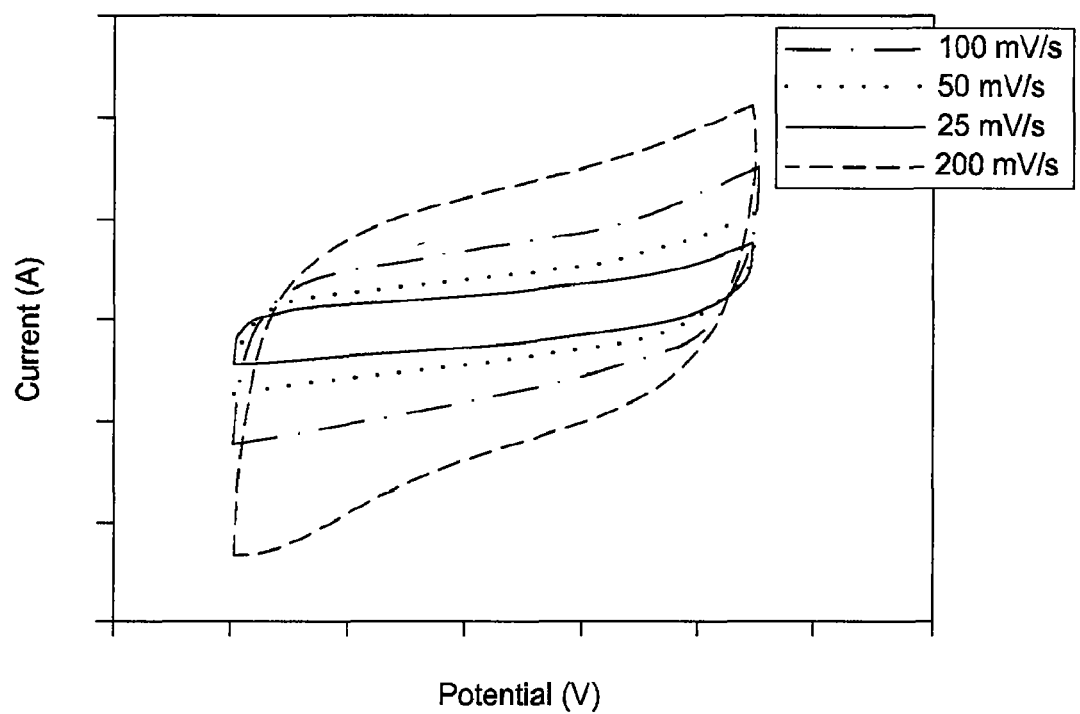
FIG. 5B is a graph illustrating current verses potential for four different ramping voltages.

FIG. 5A is a graph illustrating ramping voltage verses time. A ramping voltage (V'=dv/dt) supplied by a potentiostat 410 is represented by the dashed line. The resulting voltage (V) on the working electrode 402 is represented by the solid line. FIG. 5B is a graph illustrating current verses potential for four different ramping voltages. Although, one current measurement given a ramping voltage is sufficient to find the surface area, multiple current measurements may be used to ensure accuracy. For example, in the embodiment represented by FIG. 5B, four different ramping voltages and current measurements were used to ensure accuracy. Voltage on the anode was ramped from 1.5V to −0.6V and then back to 1.5V. Ramping voltages of 25 mV/s, 50 mV/s, 100 mV/s, and 200 mV/s were tested.

The actual current (i) for a given scan rate (V') is defined as the absolute value of one half the difference between the upper and lower current measurements in FIG. 5b. Equation 1.5 establishes that the area (A$_s$) is equal to the change of current (i) with respect to the change of ramping voltage (V'). The four different ramping voltages used are independent variables and represent the x-axis. The current measured at the specified ramping voltage is a dependent variable and graphed on the y-axis.

EXAMPLES

Figure 6:
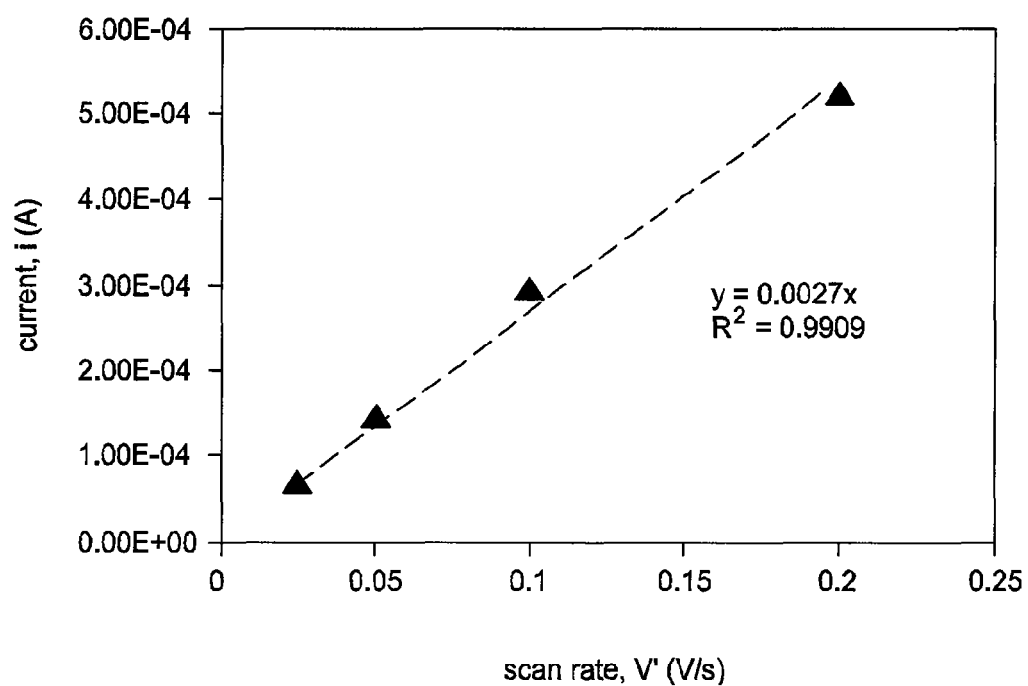
FIG. 6 is a graph illustrating current verses voltage scan rates.

FIG. 6 is a graph illustrating current, i (A), verses voltage scan rates, V' (V/s), of 25 mV/s, 50 mV/s, 100 mV/s, and 200 mV/s for a first sample of an electrode. A linear regression was performed on the data, and graphed (dashed line). The slope of the line, di/dV', is the capacitance (C), which is proportional to the surface area (A$_s$). For the first sample, the capacitance was found to be 2.7 millifarads.

Figure 7A:
FIG. 7A is a simplified schematic view of a Scanning Electron Microscope (SEM) photograph taken at 2900× of a sample of an electrode formed according to embodiments described herein.
Figure 7B:
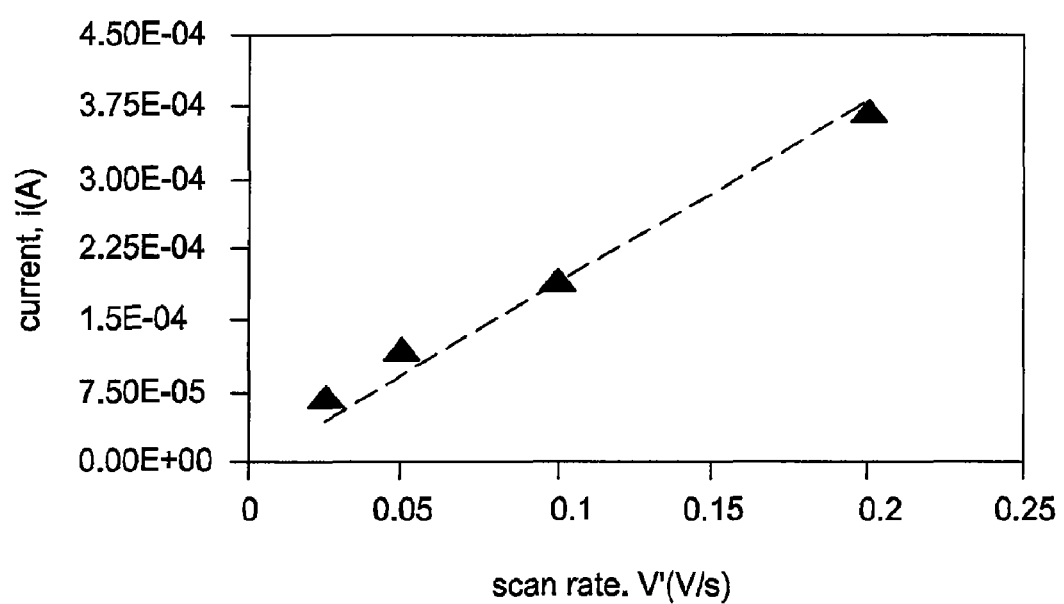
FIG. 7B is a graph illustrating current verses voltage scan rates.

FIG. 7A is a simplified schematic view of a SEM photograph taken at 2900× of a second sample of an electrode formed according to embodiments described herein. The sample is at a 45 degree tilt with respect to the lens with trigonometric tilt correction applied. The thickness of the sample is represented by the distance between the dotted lines which is about 350 pixels or 14 microns. FIG. 7B is a graph illustrating current verses voltage scan rates for V' (V/s), of 25 mV/s, 50 mV/s, 100 mV/s, and 200 mV/s. A linear regression was performed on the data, and graphed (dashed line). The slope of the line, di/dV', is the capacitance (C), which is proportional to the surface area (A$_s$). For this exemplary embodiment, the capacitance was found to be 1.9 millifarads.

Figure 8A:
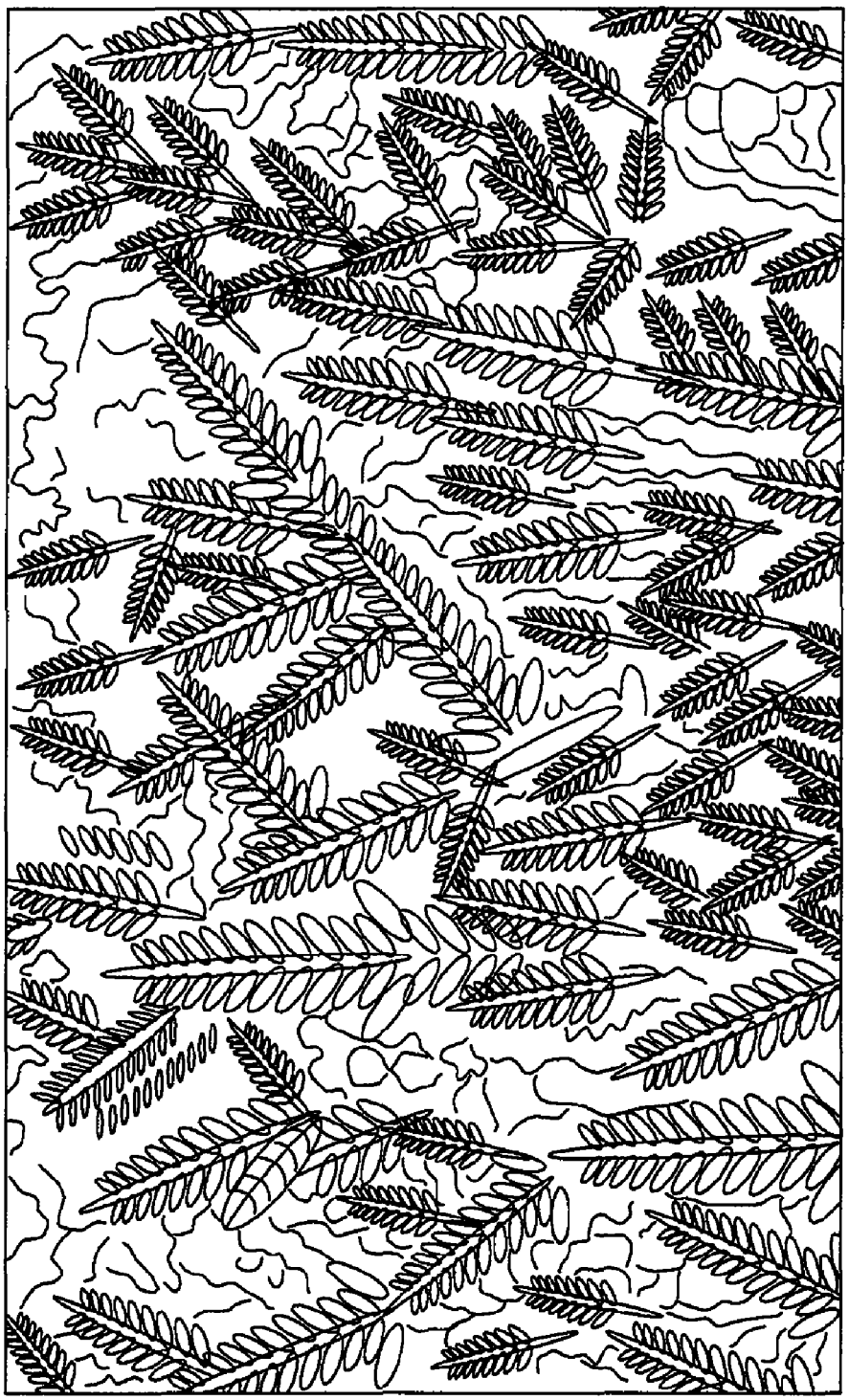
FIG. 8A is a simplified schematic view of a SEM photograph taken at 3500× of a sample of an electrode formed according to embodiments described herein.
Figure 8B:
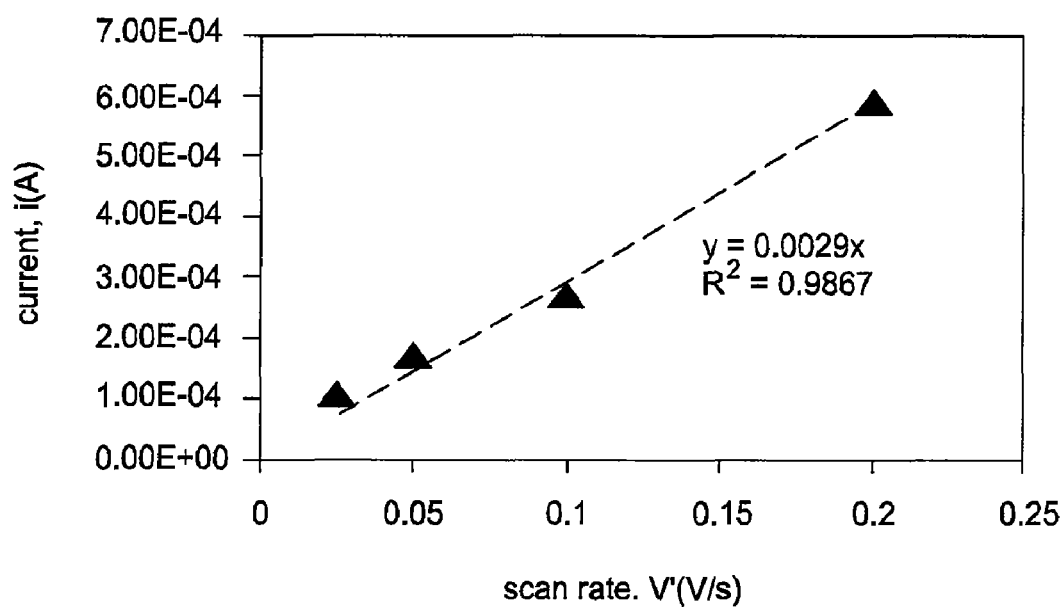
FIG. 8B is a graph illustrating current verses voltage scan rates.

FIG. 8A is a simplified schematic view of a SEM photograph taken at 3500× of a third sample of an electrode formed according to embodiments described herein. The third sample is at a 45 degree tilt with respect to the lens with trigonometric tilt correction applied. The thickness of the third sample is represented by the distance between the dotted lines which is about 540 pixels or 18 microns. FIG. 8B is a graph illustrating current verses voltage scan rates for V' (V/s), of 25 mV/s, 50 mV/s, 100 mV/s, and 200 mV/s for the third sample. A linear regression was performed on the data, and graphed (dashed line). The slope of the line, di/dV', is the capacitance (C), which is proportional to the surface area (A$_s$). For the third sample, the capacitance was found to be 2.9 millifarads.

Figure 9:
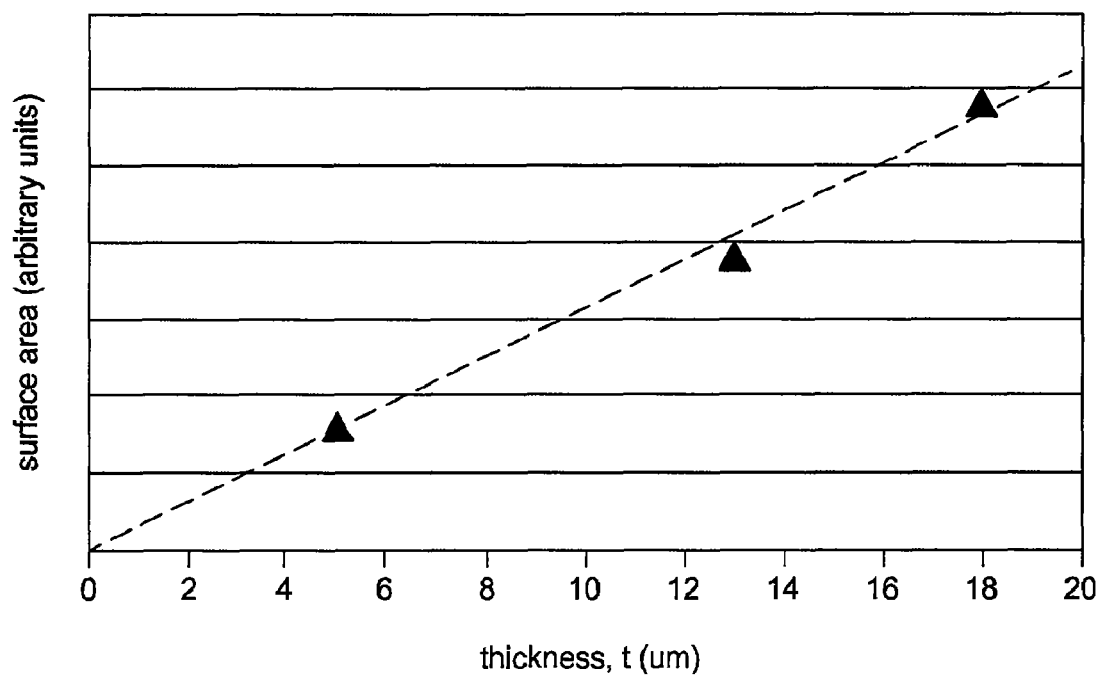
FIG. 9 is a graph illustrating surface area (arbitrary units) verses thickness (μm)

FIG. 9 is a graph illustrating surface area (arbitrary units) verses thickness (μm) for three samples from the same batch. The only parameter varied was the amount of voltage during the electrochemical deposition process. As shown in FIG. 9, a linear regression fits fairly well with the observed results.

A direct relationship between anode thickness and capacitance has been found. For three samples that were nearly identical in every regard other than thickness, a linear direct relationship was found between anode thickness and capacitance. The volume of high surface area nanostructures is directly and linearly related to the thickness of the anodic nanomaterial. This was verified by comparing cyclic voltammetry capacitance measurements with corresponding Focused Ion Beam (FIB) and Scanning Electron Microscope (SEM) thickness measurements.

Figure 10B:
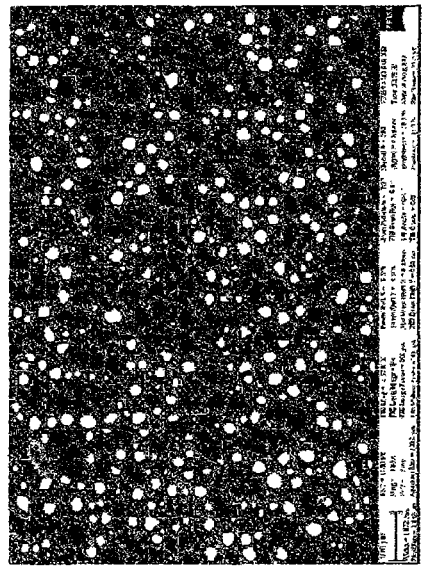
FIG. 10B is the SEM photograph of FIG. 10A where all recognized pores were filled with a white marker.
Figure 10E:
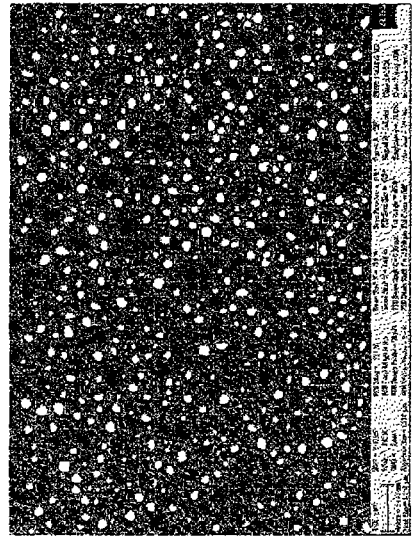
FIG. 10E is the SEM photograph of FIG. 10D where all recognized pores were filled with a white marker.
Figure 10A:
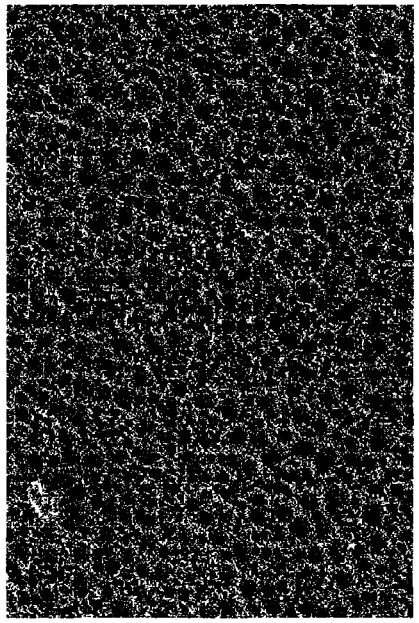
FIG. 10A is a SEM photograph taken at 100× of a sample of an electrode formed according to embodiments described herein.
Figure 10D:
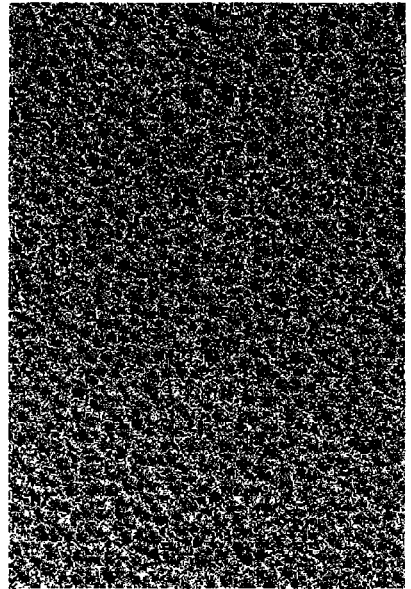
FIG. 10D is a SEM photograph taken at 100× of a sample of an electrode formed according to embodiments described herein.
Figure 10C:
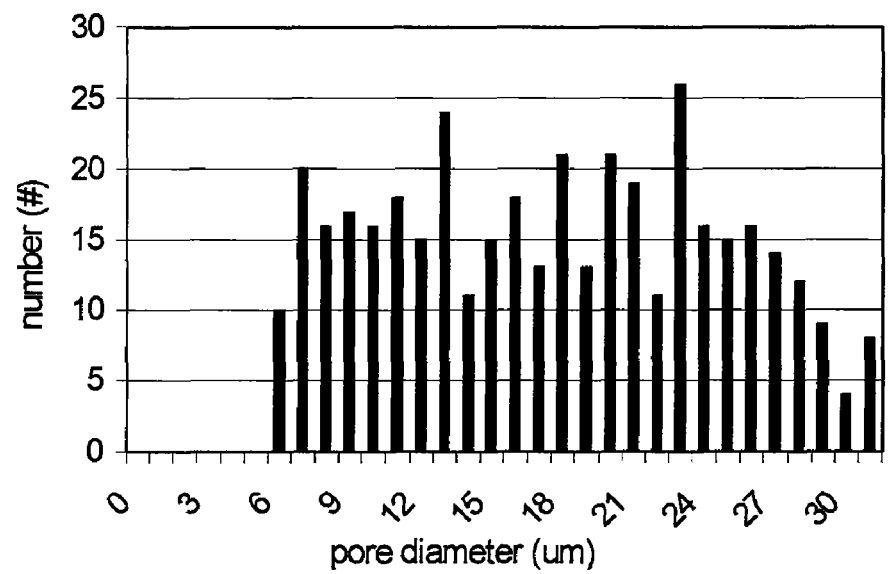
FIG. 10C is a graph depicting a pore diameter histogram representing for the sample shown in FIGS. 10A and 10B.
Figure 10F:
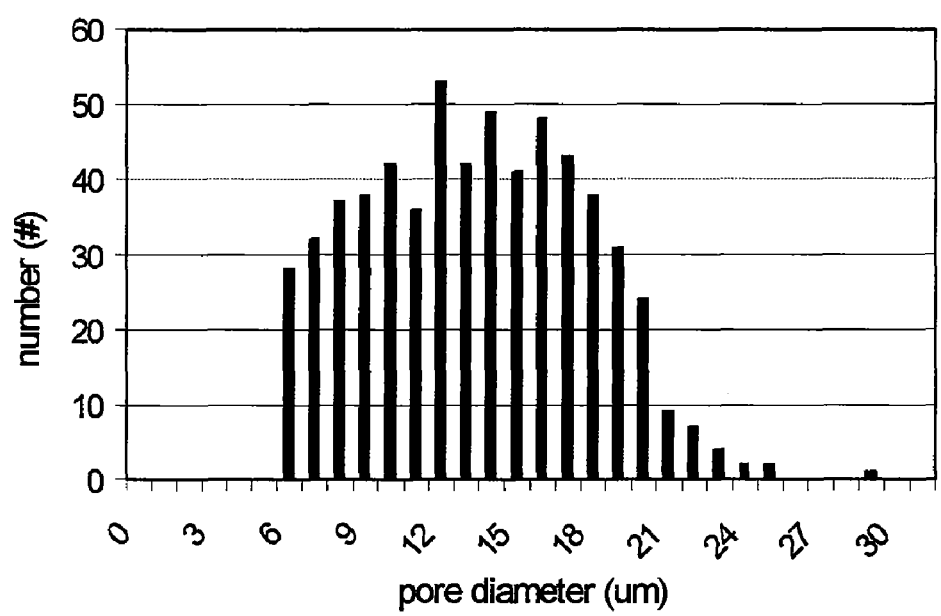
FIG. 10F is a graph depicting a pore diameter histogram representing for the sample shown in FIGS. 10D and 10E.
Figure 10H:
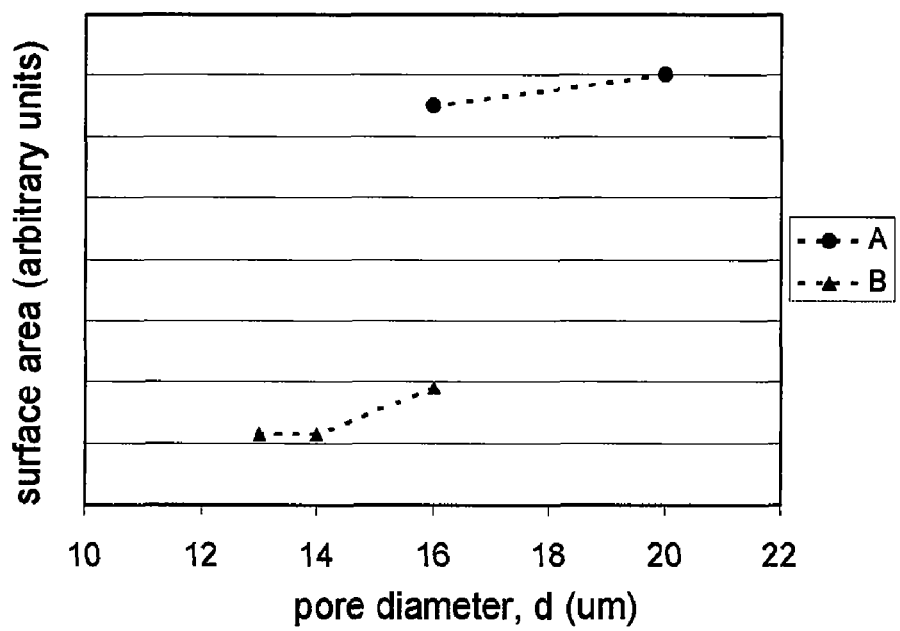
FIG. 10H is a graph depicting Surface Area ($A_s$) vs. Pore Diameter (μm) for sample batches.
Figure 10G:
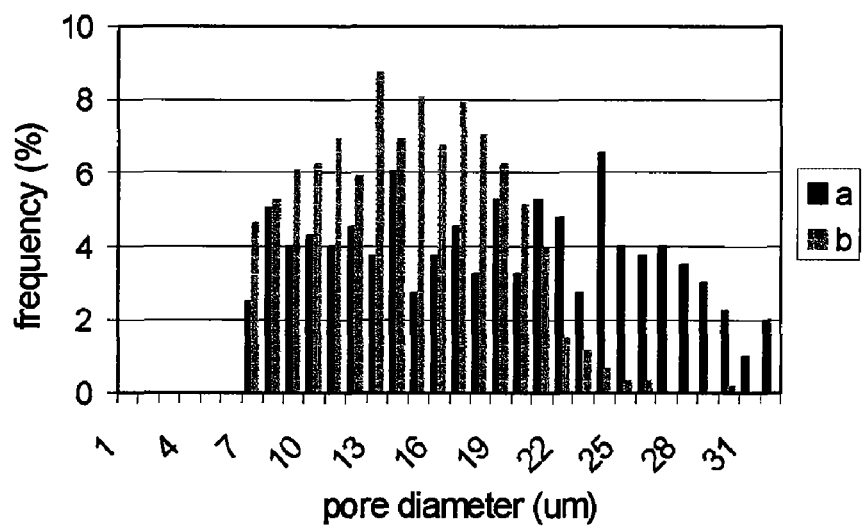
FIG. 10G is a graph depicting the histograms of FIGS. 10C and 10F normalized (to frequency) and plotted on the same axis.

Pore Size and Anode Surface Area:

FIG. 10A is a SEM photograph taken at 100× of a sample of an electrode formed according to embodiments described herein. FIG. 10B is the SEM photograph of FIG. 10A where all recognized pores were filled with a white marker. FIG. 10C is a graph depicting a pore diameter histogram representing for the sample shown in FIGS. 10A and 10B. FIG. 10D is a SEM photograph taken at 100× of a sample of an electrode formed according to embodiments described herein. FIG. 10E is the SEM photograph of FIG. 10D where all recognized pores were filled with a white marker. FIG. 10F is a graph depicting a pore diameter histogram representing for the sample shown in FIGS. 10D and 10E. FIG. 10G is a graph depicting the histograms of FIGS. 10C and 10F normalized (to frequency) and plotted on the same axis. FIG. 10H is a graph depicting Surface Area (A$_s$) vs. Pore Diameter (μm) for sample batches.

As previously discussed dendrites form into (relatively) large porous structures. It is assumed that the size of the pores effect the overall surface area of the anode and therefore Li$^+$ capacity. Testing for a correlation between anodic surface area and the size of the dendrite-less "pores" on the surface of the anode was performed using image analysis software on low resolution SEM pictures.

The image analysis software ImageJ was used to analyze pore size distribution. A set of rules and filter's were used to distinguish pores from defects and dendrites. Noise discrimination was based on circularity (>0.9) and diameter (>8 um). The criteria were fairly strict, which is why there may be some places that seem to have pores that were not recognized by the software. It is important that the boundaries do not favor specific unforeseen pore characteristics, or the results may be biased.

Although no relationship has yet been found between pore size and surface area, the software did allow us to demonstrate our ability to control the sizes of pores based on the theory of how these structures are created. By lowering the voltage and increasing time, we were able to make an anode with statistically smaller pores.

Other Metrology Techniques:

A Scanning Electron Microscope (SEM) is essential for two dimensional studies with sub-micron resolution demands. A SEM uses a high energy electron beam to create topographical grey scale images not substantially different then an optical microscope, only with greater capable magnification and focal range. Electron imaging is capable of such high resolutions because it's imaging media (electrons instead of light) has a very small wavelength.

The wavelength of the imaging media must be smaller then the subject or it will not be consistently reflected. Electrons have a wavelength on the order of $10^{-12}$ m, and compared with visible light wavelengths on the order of $10^{-9}$ m, SEM technology is capable of achieving resolutions $10^3 \times$ greater then optical technology.

Although SEMs undoubtedly present significant resolution improvements over optical imaging, there are inherent drawbacks. SEMs are virtually inoperable at atmospheric pressure. The problem is that electrons readily deflect off gaseous particles. SEM chambers are therefore kept in a partial vacuum to deter this phenomenon as much as practically possible. This adds time and money to the process of acquiring SEM images of a sample. Furthermore, the high energy electron beams can sometimes damage the sample, although we are not using great enough magnifications on the SEM or fragile enough samples for this to be a problem (SEM resolution is dependent on electron beam energy).

Energy Dispersive X-Ray Spectrometry (EDS) is a very interesting extension to SEM technology. When a sample is observed with an SEM, some atoms might become excited by the intense bombardment of the electron beam. To return to a ground energy state, the atoms will release X-Rays, the wavelength of which is characteristic to specific chemicals. EDS detects these x-rays, and derives which atoms emitted them based on their wavelength. EDS therefore provides an easy way discover the elemental composition of a sample.

A Focused Ion Beam (FIB) is also often found in a SEM as well, and can be used for imaging or cutting. A FIB is similar to a SEM, only it uses an ion beam instead of an electron beam. The FIB uses a Gallium Liquid Metal Ion Source (LMIS) because they are cheap and consistent. However, gallium ions are very heavy, making them inherently destructive to the sample when imaging. This, in turn, makes them excellent for cutting a sample.

In one embodiment, FIB cuts are used to study the thickness of dendrite growth on anodes.

Confocal imaging is a technology that has recently started gaining popularity with the new capabilities of computers. It has the ability to model a sample in 3 dimensions and often has significantly better image quality then a normal optical microscope.

The main difference between a normal optical microscope and a 3D confocal microscope is the use of a pinhole filter between the detector and focal lens. What this effectively does is filter out all unfocused light.

The confocal microscope scans the entire sample one pixel at a time. Depending on the wavelength of the light that makes it thought the pinhole, the height of each pixel can be derived and recorded.

An interesting characteristic of confocal imaging is its inherent ability to color code a sample based on height, if the light source emits the full visible spectra. This is an effect caused by the pinhole filter combined with the refractive signature of different light wavelengths. Any light not perfectly in focus will be rejected by the pinhole filter. Building on this phenomenon, all areas on a sample will be in focus, so long as it's in a detected wavelength's refracted focal plane.

Typically, confocal microscopes will use a laser light source because their local intensity is unmatched. Because a laser light source is only 1 wavelength, only 1 focal plane can be analyzed at a time. To produce a 3D image, a series of 2D image scans are performed at different heights. The resulting images are then stacked. When the 3D image is processed, an artificial coloring scheme is often added to reveal height.

Although confocal imaging is unable to achieve the resolution of an SEM, confocal imaging is vastly superior to a typical optical microscope for 3D imaging. Because confocal imaging uses an optical microscope, imaging is cheaper and quicker. Furthermore, confocal imaging is able to quantify the height of every pixel. This feature is incredibly useful for feature analysis of a 3D sample, and is far superior to contrast-based height interpretations on an SEM or regular Optical image. What confocal imagery does, essentially, is eliminate everything in that image except for that small in-focus plane by using a pinhole filter.

Figure 11:
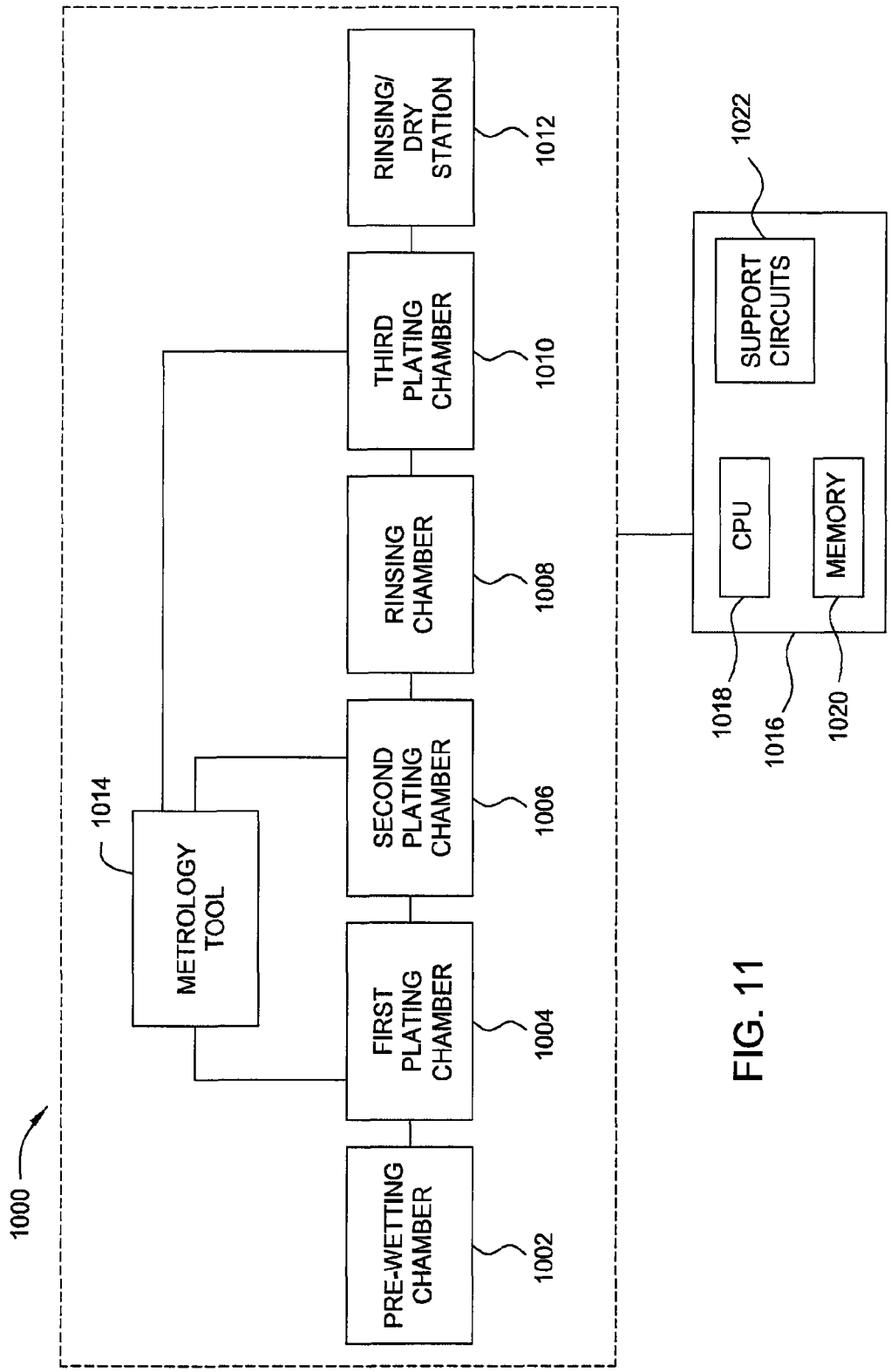
FIG. 11 schematically illustrates a processing system for plating an electrode of an electrochemical battery or capacitor according to embodiments described herein.

System:

FIG. 11 schematically illustrates a processing system 1000 configured for plating an electrode of an electrochemical battery or capacitor using a process similar to the process 200 described above.

The processing system 1000 generally comprises a plurality of processing chambers arranged in a line, each configured to perform one processing step to a substrate. In one embodiment, the substrate is formed on one portion of a continuous flexible base.

The processing system 1000 comprises a pre-wetting chamber 1002 configured to pre-wet a substrate. The processing system 1000 further comprises a first plating chamber 1004 configured to perform a first plating process on the substrate after being pre-wetted. The first plating chamber 1004 is generally disposed next to the cleaning pre-wetting station. In one embodiment, the first plating process may be plating a columnar copper layer on a seed layer formed on the substrate.

The processing system 1000 further comprises a second plating chamber 1006 disposed next to the first plating chamber 1004. The second plating chamber 1006 is configured to perform a second plating process. In one embodiment, the second plating process involves forming a porous layer of copper or alloys on the columnar copper layer.

The processing system 1000 further comprises a rinsing station 1008 disposed next to the second plating chamber 1006 and configured to rinse and remove any residual plating solution from the substrate.

In one embodiment, the processing system 1000 further comprises a third plating chamber 1010 disposed next to the rinsing station 1008. The third plating chamber 1010 is configured to perform a third plating process. In one embodiment, the third plating process involves forming a thin film over the porous layer.

The processing system 1000 further comprises a rinse-dry station 1012 disposed next to the third plating chamber 1010 and configured to rinse and dry the substrate after the plating processes and to prepare the substrate for subsequent processing. In one embodiment, the rinse-dry station 1012 may comprise one or more vapor jets configured to direct a drying vapor toward the substrate as the substrate exits the rinse-dry chamber 1012.

The processing system 1000 further comprises a metrology chamber 1014 for measuring the surface area of an electrode using capacitance measurements as described herein. In another embodiment, the metrology chamber may comprise a metrology tool selected from the group comprising a cyclic voltammetry tool, a Scanning Electron Microscope, an Energy Dispersive X-Ray Spectrometry (EDS) tool, a Focused Ion Beam (FIB) Tool, a Confocal Optical Imaging Microscope, and combinations thereof. In one embodiment, the metrology chamber 1014 is positioned such that it is accessible by both the first plating chamber 1004 and the second plating chamber 1006. In one embodiment, the metrology chamber 1014 is also accessible by the third plating chamber 1010. Although a single metrology chamber 1014 is shown, it should be understood that multiple metrology chambers may be used. For example, a separate metrology chamber may be positioned adjacent to each of the first plating chamber 1004, the second plating chamber 1006, and the third plating chamber 1010. In one embodiment, the processing chambers 1002-1012 are generally arranged along a line so that the substrates can be streamlined through each chamber. In another embodiment the metrology chamber 1014 may be positioned along a line with the processing chambers 1002-1012. In another embodiment, multiple metrology chambers may be positioned along a line with the processing chambers 1002-1012.

To facilitate control of the processing system 1000 and processes performed thereon, a controller 1016 comprising a central processing unit (CPU) 1018, memory 1020, and support circuits 1022, is coupled with the processing system 1000. The CPU 1018 may be one of any form of computer processor that can be used in an industrial setting for controlling various drives and pressures. The memory 1020 is connected to the CPU 1018. The memory 1020, or computer-readable medium, may be one or more of readily available memory such as random access memory (RAM), read only memory (ROM), floppy disk, hard disk, or any other form of digital storage, local or remote. The support circuits 1022 are connected to the CPU 1018 for supporting the processor in a conventional manner. These circuits include cache, power supplies, clock circuits, input/output circuitry, subsystems, and the like.

While the foregoing is directed to embodiments of the present invention, other and further embodiments of the invention may be devised without departing from the basic scope thereof, and the scope thereof is determined by the claims that follow.

The invention claimed is:

1. A method for forming an electrode structure for an energy storage device, comprising:
   depositing a columnar metal structure over a substrate at a first current density by a diffusion limited deposition process;
   measuring a capacitance of the columnar metal structure to determine a surface area of the columnar metal structure; and
   depositing three dimensional porous metal structures over the columnar metal structure at a second current density greater than the first current density.

2. The method of claim 1, further comprising determining if the surface area of the columnar metal layer is within specification.

3. The method of claim 2, further comprising measuring a capacitance of the porous metal structures to determine a surface area of the porous metal structure.

4. The method of claim 3, further comprising determining if the surface area of the porous metal structures is within specification.

5. The method of claim 1, wherein the measuring a capacitance of the columnar metal structure is performed using cyclic voltammetry techniques.

6. The method of claim 4, wherein the measuring a capacitance of the columnar metal structure and the measuring a capacitance of the porous metal structures are both performed using cyclic voltammetry techniques.

7. The method of claim 1, further comprising measuring a pore size of the porous metal structures using optical confocal microscopy techniques, image analysis techniques, and statistical distribution techniques.

8. The method of claim 7, further comprising producing pore diameter histograms using the pore size.

9. The method of claim 1, further comprising measuring a thickness of the porous metal structures using optical confocal microscopy techniques.

10. The method of claim 4, wherein the measuring a capacitance of the columnar metal structure to determine a surface area of the columnar metal structure comprises:
    immersing the substrate in a 0.5 M pyrophosphate solution;
    immersing a reference electrode comprising copper foil into the pyrophosphate solution; and
    immersing a counter electrode comprising platinized titanium into the pyrophosphate solution.

11. The method of claim 1, wherein the measuring a capacitance of the columnar metal structure comprises immersing the substrate in a 0.5 M pyrophosphate solution.

12. The method of claim 1, wherein the measuring a capacitance of the columnar metal structure further comprises:
    immersing a reference electrode comprising copper foil into the pyrophosphate solution; and
    immersing a counter electrode comprising platinized titanium into the pyrophosphate solution.

13. The method of claim 1, wherein the metal is selected from a group consisting of: copper, zinc, nickel, cobalt, palladium, platinum, tin, ruthenium, alloys thereof, and combinations thereof.

14. The method of claim 1, wherein the diffusion limited deposition process comprises a high plating rate electroplating process performed at current densities above the limiting current ($i_L$).

15. The method of claim 14, wherein the first current density is between about 0.05 A/cm$^2$ and about 0.3 A/cm$^2$.

16. The method of claim 15, wherein the second current density is greater than the first current density and between about 0.3 A/cm$^2$ to about 3.0 A/cm$^2$.

* * * * *